United States Patent
Gao et al.

(10) Patent No.: US 10,887,745 B2
(45) Date of Patent: Jan. 5, 2021

(54) METHOD AND DEVICE FOR SHARING FILE BETWEEN DIFFERENT TERMINALS

(71) Applicant: Huawei Technologies Co., Ltd., Shenzhen (CN)

(72) Inventors: Guangyuan Gao, Beijing (CN); Qiang Tao, Beijing (CN); Junlong Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/468,941

(22) PCT Filed: Mar. 13, 2017

(86) PCT No.: PCT/CN2017/076460
§ 371 (c)(1),
(2) Date: Jun. 12, 2019

(87) PCT Pub. No.: WO2018/107593
PCT Pub. Date: Jun. 21, 2018

(65) Prior Publication Data
US 2019/0342738 A1  Nov. 7, 2019

(30) Foreign Application Priority Data
Dec. 12, 2016 (CN) .......................... 2016 1 1142057

(51) Int. Cl.
*H04W 4/80* (2018.01)
*H04W 76/14* (2018.01)
(Continued)

(52) U.S. Cl.
CPC .............. *H04W 4/80* (2018.02); *H04L 67/06* (2013.01); *H04W 76/14* (2018.02); *H04W 84/12* (2013.01)

(58) Field of Classification Search
CPC ....... H04W 4/80; H04W 76/14; H04W 84/12; H04W 4/008; H04W 8/005; H04W 84/18;
(Continued)

(56) References Cited

U.S. PATENT DOCUMENTS

2011/0188391 A1   8/2011 Sella et al.
2012/0208462 A1*  8/2012 Lee .................. H04W 8/005
                                              455/41.2
(Continued)

FOREIGN PATENT DOCUMENTS

CN    101520803 A    9/2009
CN    101626481 A    1/2010
(Continued)

OTHER PUBLICATIONS

Machine Translation and Abstract of Chinese Publication No. CN101520803, Sep. 2, 2009, 9 pages.
(Continued)

*Primary Examiner* — Muhammad Raza
(74) *Attorney, Agent, or Firm* — Conley Rose, P.C.

(57) ABSTRACT

A method for sharing a file between different terminals includes displaying, by a first terminal when detecting a file sharing operation, a list of second terminals associated with the first terminal; sending, by the first terminal, a first control command to a second terminal when detecting an operation of selecting an identifier of the second terminal in the list of second terminals, so that the second terminal enables a WiFi point-to-point function according to the first control command, and sends a second control command to the first terminal; receiving, by the first terminal, the second control command, and enabling a WiFi point-to-point function according to the second control command; and establishing, by the first terminal, a WiFi communication link to the second terminal, and sharing a file between the first terminal
(Continued)

and the second terminal by using the WiFi communication link.

9 Claims, 13 Drawing Sheets

(51) Int. Cl.
*H04L 29/08* (2006.01)
*H04W 84/12* (2009.01)

(58) Field of Classification Search
CPC . H04W 76/023; H04W 12/003; H04W 88/06; H04L 67/06; H04L 63/18; H04L 65/403
See application file for complete search history.

(56) References Cited

U.S. PATENT DOCUMENTS

| | | | | |
|---|---|---|---|---|
| 2012/0289291 | A1* | 11/2012 | Moran | H04M 1/21 455/566 |
| 2014/0308898 | A1* | 10/2014 | Lee | H04W 12/003 455/41.3 |
| 2017/0264652 | A1* | 9/2017 | Karimli | H04L 65/1073 |

FOREIGN PATENT DOCUMENTS

| | | |
|---|---|---|
| CN | 103384369 A | 11/2013 |
| CN | 103533542 A | 1/2014 |
| CN | 104038533 A | 9/2014 |
| CN | 105119881 A | 12/2015 |
| CN | 105407213 A | 3/2016 |
| CN | 105744491 A | 7/2016 |
| EP | 2838309 A1 | 2/2015 |

OTHER PUBLICATIONS

Machine Translation and Abstract of Chinese Publication No. CN101626481, Jan. 13, 2010, 10 pages.
Machine Translation and Abstract of Chinese Publication No. CN103533542, Jan. 22, 2014, 14 pages.
Machine Translation and Abstract of Chinese Publication No. CN105119881, Dec. 2, 2015, 22 pages.
Machine Translation and Abstract of Chinese Publication No. CN105407213, Mar. 16, 2016, 11 pages.
Machine Translation and Abstract of Chinese Publication No. CN105744491, Jul. 6, 2016, 11 pages.
Foreign Communication From a Counterpart Application, Chinese Application No. 201780009060.1, Chinese Office Action dated Apr. 30, 2019, 6 pages.
Foreign Communication From a Counterpart Application, PCT Application No. PCT/CN2017/076460, English Translation of International Search Report dated Aug. 29, 2017, 2 pages.
Foreign Communication From a Counterpart Application, PCT Application No. PCT/CN2017/076460, English Translation of Written Opinion dated Aug. 29, 2017, 4 pages.
Machine Translation and Abstract of Chinese Publication No. CN104038533, Sep. 10, 2014, 38 pages.

* cited by examiner

| Device IMSI number 901 | Device SIM card number 902 | Device name 903 | Primary card/ secondary card 904 |
|---|---|---|---|
| ****** 901A | ****** 902A | First terminal 903A | Primary card 904A |
| ****** 901B | ****** 902B | Second terminal 903B | Secondary card 904B |
| ****** 901C | ****** 902C | Third terminal 903C | Secondary card 904C |

METHOD AND DEVICE FOR SHARING FILE BETWEEN DIFFERENT TERMINALS

CROSS-REFERENCE TO RELATED APPLICATIONS

This application is a national state application of Int'l Patent App. No. PCT/CN2017/076460 filed on Mar. 13, 2017, which claims priority to Chinese Patent App. No. 201611142057.0 filed on Dec. 12, 2016, which are incorporated by reference.

TECHNICAL FIELD

This application relates to the field of wireless communications technologies, and in particular, to a method and device for sharing a file between different terminals.

BACKGROUND

With development of intelligent terminals, it is increasingly popular for a user to have a plurality of terminals. For example, a user may have three terminals: a mobile phone, a tablet computer, and a smartwatch at the same time. In the prior art, a user usually has a requirement for sharing a file between different terminals of the user. For example, the user may need to use a tablet computer to view a file in a mobile phone; therefore, the user needs to transmit the file in the mobile phone to the tablet computer.

Currently, the following three manners can support sharing a file between different terminals: a Bluetooth manner, a WiFi point-to-point (Point to Point, point-to-point) manner, and an existing USB wired manner. However, the Bluetooth manner has a relatively low transmission speed. When a user transmits a file with a large amount of data in the Bluetooth manner, the user needs to wait for a relatively long time. Consequently, user experience is relatively poor. For the existing USB wired manner, a computer needs to be used as an intermediate medium. Still in the foregoing example, if the user needs to transmit the file in the mobile phone to the tablet computer, the user needs to first connect the mobile phone to the computer by using a USB, and then transmit the file in the mobile phone to the computer. Then, the user connects the tablet computer to the computer by using a USB, and then transmits the file in the computer to the tablet computer. For the WiFi P2P manner, a transmission speed of the WiFi P2P manner is higher than that of the Bluetooth manner, and there is no need to use a computer as a medium. This perfectly resolves problems of the foregoing two transmission manners.

In the prior art, when a user transmits a file between different terminals in the WiFi P2P manner, specific operation steps of the user are as follows: Step 1: The user enables a WiFi P2P function in a terminal that is to transmit the file (which is referred to as a sending terminal for short below). Step 2: The user enables a WiFi P2P function in a terminal that is to receive the file (which is referred to as a receiving terminal for short below). Step 3: The user enables a WiFi P2P search function in the sending terminal, and in this case, the sending terminal searches for a nearby terminal that enables a WiFi P2P function. Step 4: When the sending terminal finds the receiving terminal, the user initiates a WiFi P2P connection request to the receiving terminal. Step 5: When the receiving terminal receives the WiFi P2P connection request, the user accepts the WiFi P2P connection in the receiving terminal. Step 6: The user selects the file in the sending terminal to transmit the file. Step 7: The user receives the file in the receiving terminal. In addition, the WiFi P2P transmission manner is different from the Bluetooth transmission manner, and when transmitting a file in the WiFi P2P manner, the user needs to perform the foregoing seven steps for each time of file transmission. That is, the foregoing seven steps are indispensable steps of transmitting a file in the WiFi P2P manner. Consequently, when the user transmits a file in the WiFi P2P manner, the operations are tedious and experience is relatively poor.

SUMMARY

Embodiments of this application provide a method and a device for transmitting a file between different terminals, to reduce operation steps of transmitting a file by a user in a WiFi P2P manner, and improve user experience.

According to a first aspect, a method for sharing a file between different terminals is provided, including: displaying, by a first terminal when detecting a file sharing operation, a list of second terminals associated with the first terminal, where the list of second terminals includes an identifier of at least one second terminal; sending, by the first terminal, a first control command to a second terminal when detecting an operation of selecting an identifier of the second terminal in the list of second terminals, so that the second terminal enables a WiFi point-to-point function according to the first control command, and sends a second control command to the first terminal; receiving, by the first terminal, the second control command, and enabling a WiFi point-to-point function according to the second control command; and establishing, by the first terminal, a WiFi communication link to the second terminal, and sharing a file between the first terminal and the second terminal by using the WiFi communication link.

It may be learned that a user needs to perform, in the first terminal, operations of only two steps of performing file sharing and selecting the identifier of the second terminal. This is convenient for the user to share the file by using a WiFi P2P function.

With reference to the first aspect, in a first possible implementation of the first aspect, the shared file is a first file on the first terminal, and the sharing, by the first terminal, a file between the first terminal and the second terminal by using the WiFi communication link includes: transmitting, by the first terminal, the first file to the second terminal by using the WiFi communication link.

With reference to the first aspect, in a second possible implementation of the first aspect, the shared file is a second file on the second terminal, and the sharing, by the first terminal, a file between the first terminal and the second terminal by using the WiFi communication link includes: receiving, by the first terminal by using the WiFi communication link, the second file sent by the second terminal.

With reference to the second possible implementation of the first aspect, in a third possible implementation, the receiving, by the first terminal by using the WiFi communication link, the second file sent by the second terminal includes: receiving, by the first terminal by using the WiFi communication link, a file list of second files that is sent by the second terminal, where the file list of second files includes identifiers of the second files; displaying, by the first terminal, the file list of second files; and performing, by the first terminal, a corresponding operation on the second file based on the file list of second files.

It may be learned that the first terminal displays only a list of shared files in the second terminal, and a user can view the shared file online or download the shared file based on the list of shared files. This facilitates use for the user.

With reference to the first aspect, the first possible implementation of the first aspect, the second possible implementation of the first aspect, and the third possible implementation of the first aspect, in a fourth possible implementation, the displaying, by a first terminal when detecting a file sharing operation, a list of second terminals associated with the first terminal includes: searching, by the first terminal, for a second terminal in a preset manner when detecting the file sharing operation; and displaying, by the first terminal, the list of second terminals when determining that the found second terminal is valid.

It may be learned that the first terminal displays only a list of valid second terminals, thereby improving security of file sharing between the two terminals.

With reference to the fourth possible implementation of the first aspect, in a fifth possible implementation, the first terminal supports Bluetooth transmission, and the preset manner is a Bluetooth low energy transmission manner; and the displaying, by the first terminal, the list of second terminals when determining that the found second terminal is valid includes: receiving, by the first terminal, a broadcast message sent by the found second terminal in the Bluetooth low energy transmission manner, where the broadcast message includes a first check parameter; and displaying, by the first terminal, the list of second terminals when determining that the first check parameter is valid.

It may be learned that power consumption is reduced by sending the broadcast message in the Bluetooth low energy manner.

With reference to the first aspect, the first possible implementation of the first aspect, the second possible implementation of the first aspect, and the third possible implementation of the first aspect, in a sixth possible implementation, the displaying, by a first terminal when detecting a file sharing operation, a list of second terminals associated with the first terminal includes: obtaining, by the first terminal when detecting the file sharing operation, an identifier of a second terminal that has an association relationship with the first terminal; and displaying, by the first terminal, the list of second terminals that have an association relationship with the first terminal.

It may be learned that obtaining the identifier of the second terminal by pre-storing the association relationship can improve security of the displayed second terminal.

With reference to the sixth possible implementation of the first aspect, in a seventh possible implementation, the list of second terminals that have an association relationship with the first terminal is a list of identifiers of second terminals that perform a same Multiple IMSI Single MSISDN service with the first terminal, where all terminals that perform the Multiple IMSI Single MSISDN service have a same mobile station international ISDN number; and the obtaining, by the first terminal when detecting the file sharing operation, the list of second terminals that have an association relationship with the first terminal includes: when detecting the file sharing operation, obtaining, by the first terminal from a preset server, the list of identifiers of the second terminals that perform the same Multiple IMSI Single MSISDN service with the first terminal.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, and the seventh possible implementation of the first aspect, in an eighth possible implementation, the establishing, by the first terminal, a WiFi communication link to the second terminal based on the WiFi point-to-point function of the first terminal and the WiFi point-to-point function of the second terminal includes: receiving, by the first terminal by using the WiFi point-to-point function of the first terminal, a WiFi radio frequency signal sent by the second terminal, where the WiFi radio frequency signal is sent by the second terminal to the first terminal when the second terminal enables the WiFi point-to-point function, and the WiFi radio frequency signal carries a second check parameter; verifying, by the first terminal, validity of the second terminal based on the second check parameter in the WiFi radio frequency signal; when determining that the second terminal is valid, sending, by the first terminal to the second terminal, a request for establishing the WiFi communication link, where the request for establishing the WiFi communication link includes a third check parameter, so that the second terminal verifies validity of the first terminal based on the third check parameter, and after the verification succeeds, sends, to the first terminal, a response message for establishing the WiFi communication link; and establishing, by the first terminal, the WiFi communication link to the second terminal when receiving the response message.

It may be learned that security of the established WiFi communication link can be improved through parameter verification.

According to a second aspect, this application provides a device for sharing a file between different terminals. The device includes a processor and a memory; and the processor is configured to read code in the memory so as to: display, when detecting a file sharing operation, a list of second terminals associated with the first terminal, where the list of second terminals includes an identifier of at least one second terminal; send a first control command to a second terminal when detecting an operation of selecting an identifier of the second terminal in the list of second terminals, so that the second terminal enables a WiFi point-to-point function according to the first control command, and sends a second control command to the first terminal; receive the second control command, and enable a WiFi point-to-point function according to the second control command; and establish a WiFi communication link to the second terminal, and share a file between the first terminal and the second terminal by using the WiFi communication link.

With reference to the second aspect, in a first possible implementation, the shared file is a first file on the first terminal, and when sharing the file between the first terminal and the second terminal by using the WiFi communication link, the processor is specifically configured to: transmit the first file to the second terminal by using the WiFi communication link.

With reference to the second aspect, in a second possible implementation, the shared file is a second file on the second terminal, and when sharing the file between the first terminal and the second terminal by using the WiFi communication link, the processor is specifically configured to: receive, by using the WiFi communication link, the second file sent by the second terminal.

With reference to the second possible implementation of the second aspect, in a third possible implementation, when receiving, by using the WiFi communication link, the second file sent by the second terminal, the processor is specifically configured to: receive, by using the WiFi communication link, a file list of second files that is sent by the second terminal, where the file list of second files includes identifiers of the second files; display the file list of second files; and perform a corresponding operation on the second file based on the file list of second files.

With reference to the second aspect, the first possible implementation, the second possible implementation, and the third possible implementation, in a fourth possible implementation, when displaying, when detecting the file sharing operation, the list of second terminals associated with the first terminal, the processor is specifically configured to: search for a second terminal in a preset manner when detecting the file sharing operation; and display the list of second terminals when determining that the found second terminal is valid.

With reference to the fourth possible implementation of the second aspect, in a fifth possible implementation, the first terminal supports Bluetooth transmission, and the preset manner is a Bluetooth low energy transmission manner; and when displaying the list of second terminals when determining that the found second terminal is valid, the processor is specifically configured to: receive a broadcast message sent by the found second terminal in the Bluetooth low energy transmission manner, where the broadcast message includes a first check parameter; and display the list of second terminals when determining that the first check parameter is valid.

With reference to the second aspect, the first possible implementation of the second aspect, the second possible implementation of the second aspect, and the third possible implementation of the second aspect, in a sixth possible implementation, when displaying, when detecting the file sharing operation, the list of second terminals associated with the first terminal, the processor is specifically configured to: obtain, when detecting the file sharing operation, an identifier of a second terminal that has an association relationship with the first terminal; and display the list of second terminals that have an association relationship with the first terminal.

With reference to the sixth possible implementation of the second aspect, in a seventh possible implementation, the list of second terminals that have an association relationship with the first terminal is a list of identifiers of second terminals that perform a same Multiple IMSI Single MSISDN service with the first terminal, where all terminals that perform the Multiple IMSI Single MSISDN service have a same mobile station international ISDN number; and when obtaining, when detecting the file sharing operation, the list of second terminals that have an association relationship with the first terminal, the processor is specifically configured to: when detecting the file sharing operation, obtain, from a preset server, the list of identifiers of the second terminals that perform the same Multiple IMSI Single MSISDN service with the first terminal.

With reference to the second aspect, the first possible implementation of the second aspect, the second possible implementation of the second aspect, the third possible implementation of the second aspect, the fourth possible implementation of the second aspect, the fifth possible implementation of the second aspect, the sixth possible implementation of the second aspect, and the seventh possible implementation of the second aspect, in an eighth possible implementation, when establishing the WiFi communication link to the second terminal based on the WiFi point-to-point function of the first terminal and the WiFi point-to-point function of the second terminal, the processor is specifically configured to: receive, by using the WiFi point-to-point function of the first terminal, a WiFi radio frequency signal sent by the second terminal, where the WiFi radio frequency signal is sent by the second terminal to the first terminal when the second terminal enables the WiFi point-to-point function, and the WiFi radio frequency signal carries a second check parameter; verify validity of the second terminal based on the second check parameter in the WiFi radio frequency signal; when determining that the second terminal is valid, send, to the second terminal, a request for establishing the WiFi communication link, where the request for establishing the WiFi communication link includes a third check parameter, so that the second terminal verifies validity of the first terminal based on the third check parameter, and after the verification succeeds, sends, to the first terminal, a response message for establishing the WiFi communication link; and establish the WiFi communication link to the second terminal when receiving the response message.

For any one of the second aspect or the implementations of the second aspect in this application for implementing the device and beneficial effects, and any one of the first aspect or the implementations of the first aspect in the present invention for implementing the method and beneficial effects, mutual reference may be made to each other. No repeated description is provided.

According to a third aspect, this application further provides a readable storage medium, configured to store a software instruction used to execute the function in any one of the first aspect or the implementations of the first aspect of the present invention. The software instruction includes a program designed for performing the method in any one of the first aspect or the implementations of the first aspect of the present invention.

According to a fourth aspect, a method for logging in to a network in a relay manner is provided, including: when detecting an operation of logging in to a network in a relay manner, displaying, by a first terminal, an identifier of a second terminal associated with the first terminal; sending, by the first terminal, a relay request to the second terminal when detecting an operation of selecting the identifier of the second terminal, so that the second terminal enables a relay hotspot according to the relay request, generates a related parameter associated with the relay hotspot, and sends the related parameter to the first terminal; and when receiving the related parameter, logging, by the first terminal, in to the network by using the second terminal as a relay based on the related parameter.

It may be learned that a user can log in to the network at one click. This facilitates use for the user.

With reference to the fourth aspect, in a first possible implementation, the sending, by the first terminal, a relay request to the second terminal when detecting an operation of selecting the identifier of the second terminal includes: sending, by the first terminal, a first control command to the second terminal when detecting that the identifier of the second terminal is selected, so that the second terminal enables a WiFi point-to-point function according to the first control command, and sends a second control command to the first terminal; receiving, by the first terminal, the second control command, and enabling a WiFi point-to-point function according to the second control command; establishing, by the first terminal, a WiFi communication link to the second terminal based on the WiFi point-to-point function of the first terminal and the WiFi point-to-point function of the second terminal; and sending, by the first terminal, the relay request by using the WiFi communication link; and the receiving, by the first terminal, the related parameter includes: receiving, by the first terminal, the related parameter by using the WiFi communication link.

With reference to the fourth aspect, in a second possible implementation, the sending, by the first terminal, a relay request to the second terminal when detecting an operation of selecting the identifier of the second terminal includes: sending, by the first terminal, the relay request to the second terminal in a Bluetooth manner when detecting that the identifier of the second terminal is selected; and the receiving, by the first terminal, the related parameter includes: receiving, by the first terminal, the related parameter in the Bluetooth manner.

According to a fifth aspect, a device for logging in to a network in a relay manner is provided. The device includes a processor and a memory; and the processor is configured to read code in the memory so as to: when detecting an operation of logging in to a network in a relay manner, display an identifier of a second terminal associated with the device for logging in to a network in a relay manner; send a relay request to the second terminal when detecting an operation of selecting the identifier of the second terminal; so that the second terminal enables a relay hotspot according to the relay request, generates a related parameter associated with the relay hotspot, and sends the related parameter to the device; and when receiving the related parameter, log in to the network by using the second terminal as a relay based on the related parameter.

With reference to the fifth aspect, in a first possible implementation, when sending the relay request to the second terminal when detecting the operation of selecting the identifier of the second terminal, the processor is specifically configured to: send a first control command to the second terminal when detecting that the identifier of the second terminal is selected, so that the second terminal enables a WiFi point-to-point function according to the first control command, and sends a second control command to the device; receive the second control command, and enable a WiFi point-to-point function according to the second control command; establish a WiFi communication link to the second terminal based on the WiFi point-to-point function of the device and the WiFi point-to-point function of the second terminal; and send the relay request by using the WiFi communication link; and when receiving the related parameter, the processor is specifically configured to: receive the related parameter by using the WiFi communication link.

With reference to the fifth aspect; in a second possible implementation, when sending the relay request to the second terminal when detecting the operation of selecting the identifier of the second terminal, the processor is specifically configured to: send the relay request to the second terminal in a Bluetooth manner when detecting that the identifier of the second terminal is selected; and when receiving the related parameter, the processor is specifically configured to: receive the related parameter in the Bluetooth manner.

For any one of the fifth aspect or the implementations of the fifth aspect in this application for implementing the device and beneficial effects, and any one of the fourth aspect or the implementations of the fourth aspect in the present invention for implementing the method and beneficial effects, mutual reference may be made to each other. No repeated description is provided.

According to a sixth aspect, this application further provides a readable storage medium, configured to store a software instruction used to execute the function in any one of the fourth aspect or the implementations of the fourth aspect of the present invention. The software instruction includes a program designed for performing the method in any one of the fourth aspect or the implementations of the fourth aspect of the present invention.

It may be learned from the foregoing that in the embodiments of this application, when a user needs to share the file in a WiFi P2P manner, the user needs to perform operations of only two steps of performing file sharing and selecting a terminal to be shared with (namely, the second terminal), and the first terminal and the second terminal may automatically enable the WiFi P2P function and establish the WiFi communication link. Therefore, operation steps of the user can be reduced, and user experience can be improved by using the method in this application compared with the prior art in which a user needs to perform operations of seven steps each time the user shares a file by using a WiFi P2P function.

DESCRIPTION OF EMBODIMENTS

The following further describes the embodiments of this application in detail with reference to the accompanying drawings.

This application provides a method and device for sharing a file between different terminals. An application scenario of this application is first described.

With development of intelligent terminals, it is increasingly popular for a user to have a plurality of terminals. For example, a user may have three terminals: a smartphone, a tablet computer, and a smartwatch at the same time. In addition, in actual application, a user usually has a requirement for sharing a file between different terminals. For example, the user needs to use a tablet computer to view a file in a mobile phone; therefore, the user needs to transmit the file in the mobile phone to the tablet computer.

On this basis, this application provides a technical solution. In the technical solution, a user can share a file between different terminals in a WiFi P2P manner by performing only a few operation steps. The following describes the technical solution in detail by using the embodiments.

Embodiment 1

This application provides a file sharing method. By using the method of this application, when a user shares a file in a WiFi P2P manner, the user can implement file sharing between two terminals by performing only two steps (which are respectively a file sharing operation and an operation of selecting a terminal to be shared with). This reduces operations of the user, and improves user experience compared with the prior art in which a user performs operations of the seven steps.

Figure 1:
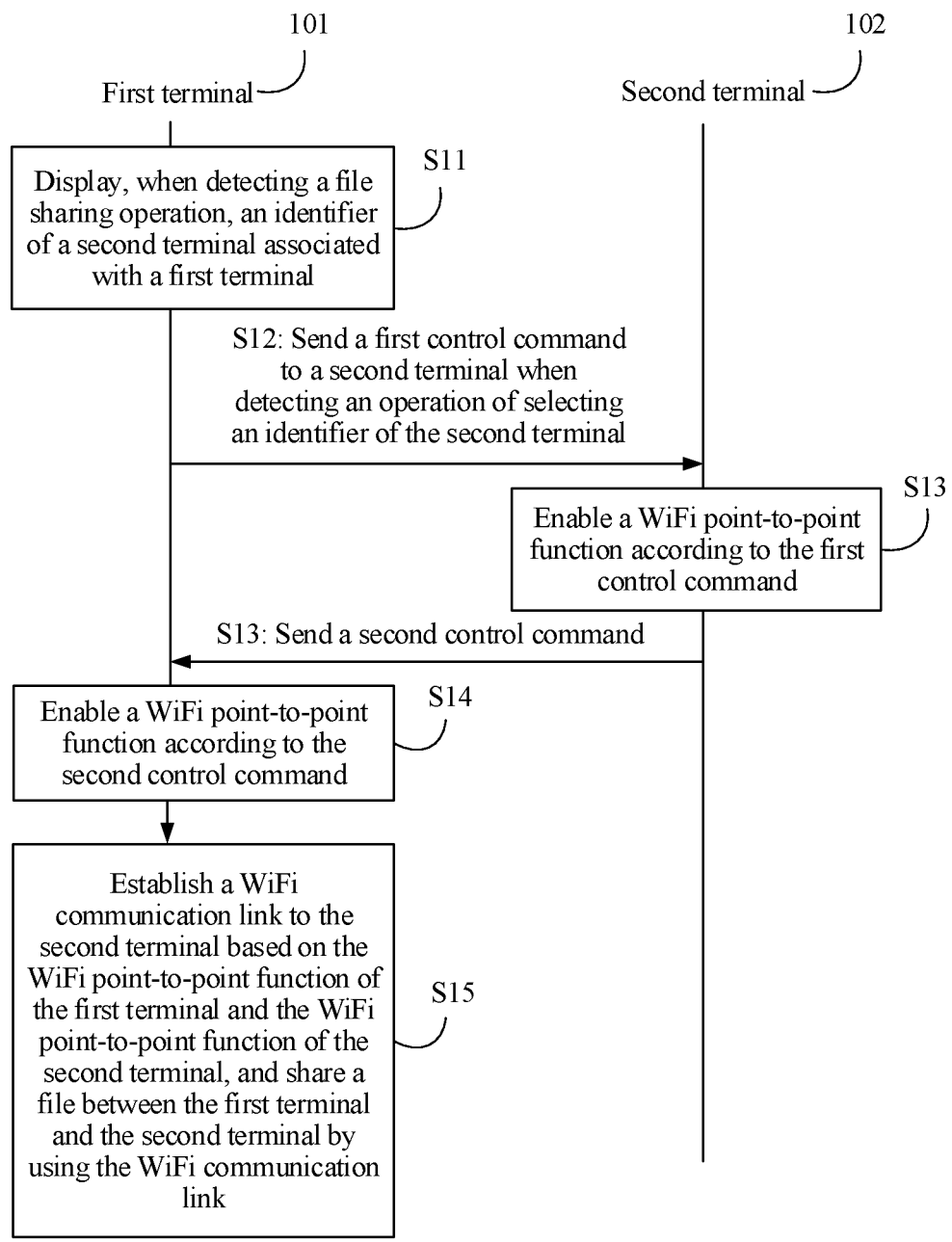
FIG. 1 is a schematic diagram of file sharing according to an embodiment of this application.

In this embodiment of this application, as shown in FIG. 1, the method provided in this application is specifically as follows:

Step S11: A first terminal 101 displays, when detecting a file sharing operation, a list of second terminals associated with the first terminal 101, where the list of second terminals includes an identifier of one or more second terminals 102.

Figure 12:
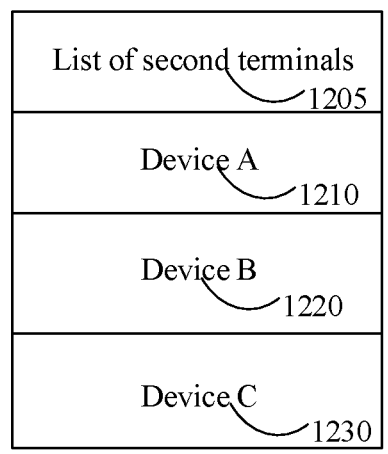
FIG. 12 is a schematic diagram of a list of second terminals according to an embodiment of this application.

In this application, the second file list may be specifically a list of terminals that belong to a same user as the first terminal 101. For example, the terminals that belong to the same user as the first terminal 101 are a terminal A, a terminal B, and a terminal C, and the list of second terminals 1205 (listing Device A 1210, Device B 1220, Device C 1230) may be specifically shown in FIG. 12.

Step S12: The first terminal 101 sends a first control command to a second terminal 102 when detecting an operation of selecting an identifier of the second terminal 102 in the list of second terminals.

Step S13: The second terminal 102 enables a WiFi point-to-point function according to the first control command, and sends a second control command to the first terminal 101.

Step S14: The first terminal 101 enables a WiFi point-to-point function according to the second control command.

Step S15: The first terminal 101 establishes a WiFi communication link to the second terminal 102, and shares a file between the first terminal 101 and the second terminal 102 by using the WiFi communication link.

It should be noted that in this application, terminals are referred to as the first terminal 101 and the second terminal 102 merely for ease of description. In actual application, the first terminal 101 and the second terminal 102 may be terminals of a same type or terminals of different types. For example, each of the first terminal 101 and the second terminal 102 may be any one of a smartphone, a portable computer, a motion camera, a wearable device, and the like in the prior art.

In actual application, a file on the first terminal 101 or a file on the second terminal 102 may be shared by using the method. In this embodiment of this application, to conveniently distinguish between different files, specifically, a to-be-shared file on the first terminal 101 may be referred to as a first file, and a to-be-shared file on the second terminal 102 may be referred to as a second file. In this embodiment of this application, the foregoing two cases are separately used as an example to describe the technical solution of this application in detail.

Figure 2:
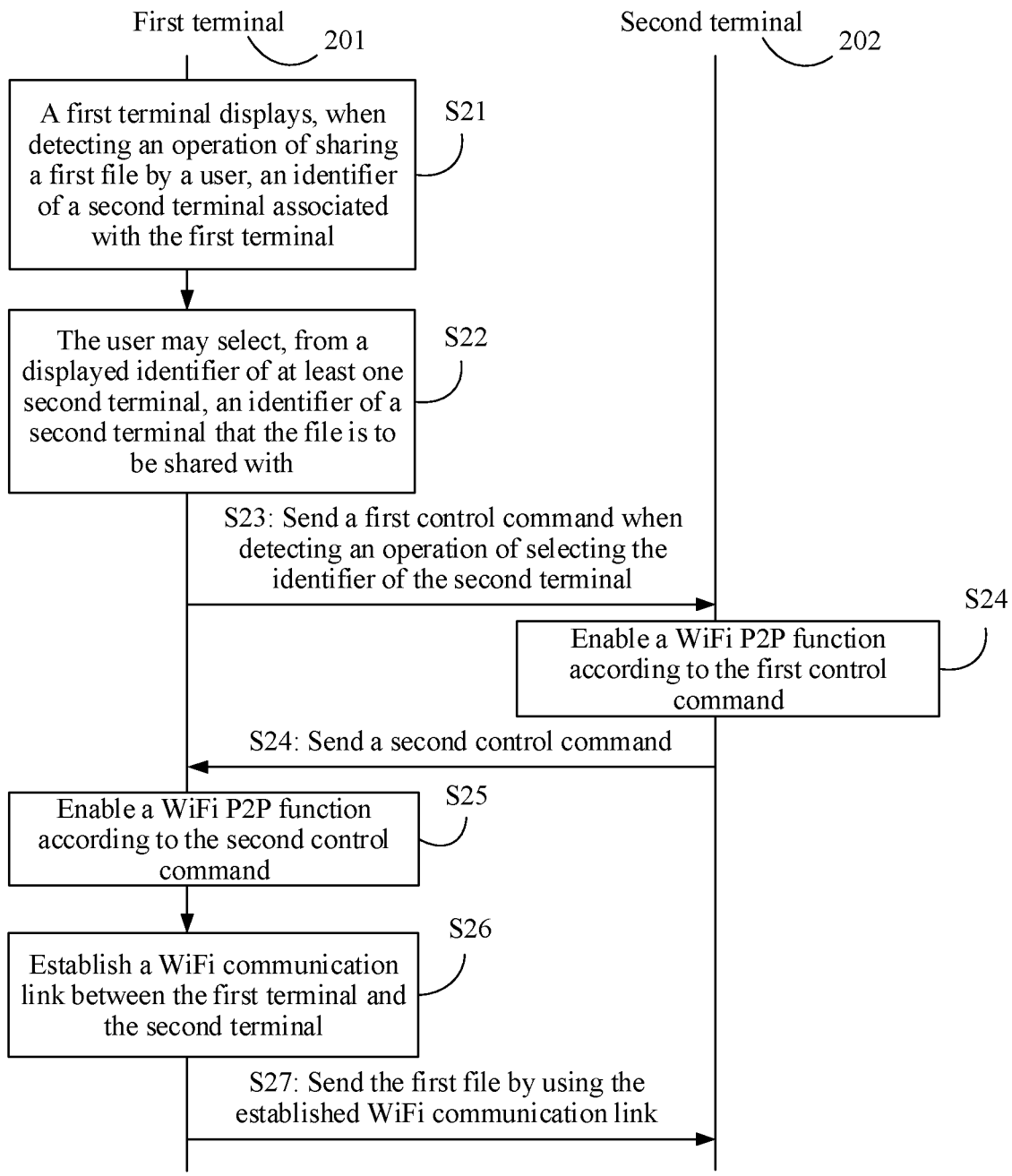
FIG. 2 is another schematic diagram of file sharing according to an embodiment of this application.

First case: A first file on the first terminal 201 is to be shared. As shown in FIG. 2, the method is specifically as follows:

Step S21: The first terminal 201 displays, when detecting an operation of sharing a first file by a user, an identifier of a second terminal 202 associated with the first terminal 201.

Figure 3:
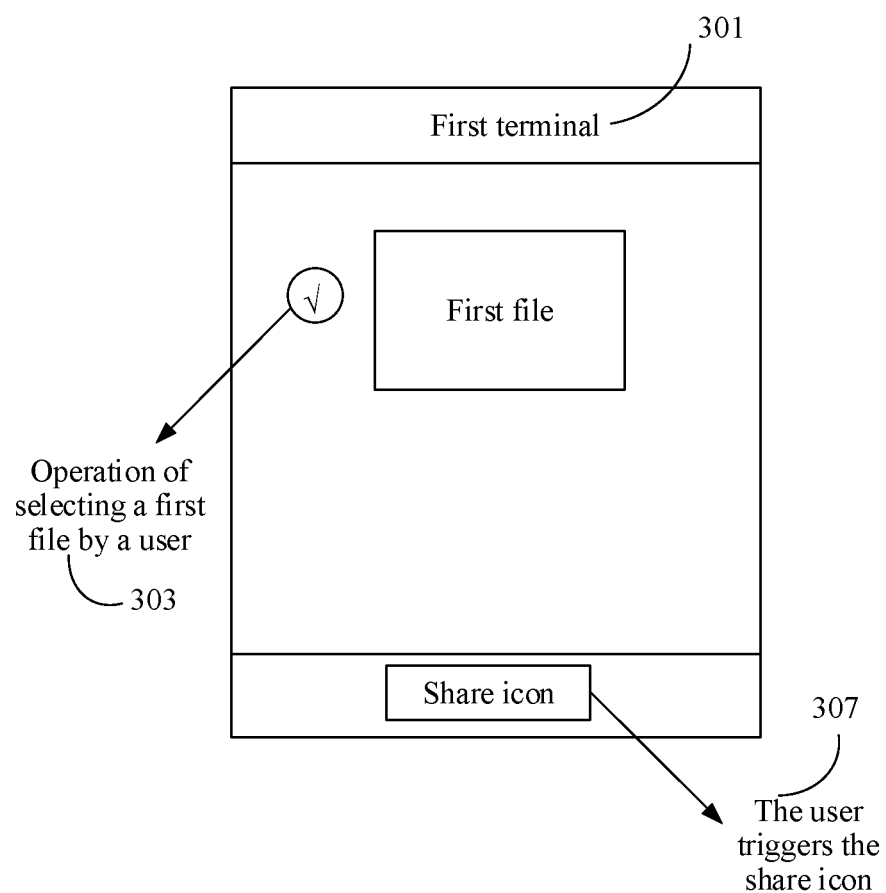
FIG. 3 is a schematic diagram of an operation performed by a user to share a file according to an embodiment of this application.

In this application, the user may perform the operation of sharing the first file on the first terminal 201. As shown in FIG. 3, the operation 303 of sharing the first file 305 by the user may be specifically opening a display directory of the first file 305, selecting the first file 305, and then tapping 307 a share icon. It should be noted that in actual application, names of the sharing icon in terminals 301 of different vendors are different. Therefore, the "share icon" may alternatively be specifically a "sharing icon", a "sending icon", or the like. The first file 305 may be specifically a video, music, a picture, a text, an installation package of an application program/operating system, or the like.

In this embodiment of this application, the first terminal 201 may search for a second terminal 202 in a preset manner when detecting the file sharing operation; and the first terminal 201 may specifically display an identifier of the second terminal 202 in a form of a list of second terminals when determining that the found second terminal 202 is valid.

In actual application, most terminals support a Bluetooth wireless transmission manner. Therefore, in this embodiment of this application, specifically, the first terminal 201 initiates a search for a nearby Bluetooth device when detecting the file sharing operation. When finding a nearby Bluetooth device, the first terminal 201 obtains a first check parameter in a broadcast message of the Bluetooth device; and when determining that the first check parameter is valid, the first terminal 201 displays a name of a second terminal 202 corresponding to the Bluetooth device.

Because an application scenario of this application is file sharing between different terminals of a same user, the different terminals of the same user may have a same user identifier. The identifier may be specifically a phone number of the user, a social software account of the user (such as a WeChat account or a QQ account of the user), an identifier pre-allocated to the user (such as a Huawei account or a user identity number allocated to the user), or the like. In this embodiment of this application, when sending the broadcast message by using Bluetooth, the terminal adds the user identifier to the Bluetooth broadcast message, and the user identifier is specifically the first check parameter. When receiving broadcast messages from different Bluetooth devices, the first terminal 201 may specifically parse the broadcast message to obtain a user identifier. If the user identifier is the same as a user identifier in the first terminal 201, it may be considered that the terminal device corresponding to the Bluetooth device is valid. In other words, the terminal device corresponding to the Bluetooth device belongs to the same user as the first terminal 201. In this case, identification information of the valid device, namely, the second terminal 202, is displayed in the first terminal 201. It should be noted that the Bluetooth manner may be Bluetooth low energy (Bluetooth low energy, BLE).

More specifically, in actual application, the user may use different terminals of the user to log in to social software (such as WeChat or QQ). Therefore, in this embodiment of this application, the terminal may automatically obtain a social software account of the user (such as a WeChat account or a QQ account), and then automatically add the social software account to a Bluetooth message to broadcast the Bluetooth message. In this embodiment of this application, the first terminal 201 may further store identification information of a terminal that has an association relationship with the first terminal 201. For example, the first terminal 201 stores an IMSI number of the terminal that has an association relationship with the first terminal 201. The association relationship may be specifically that the terminal belongs to the same user as the first terminal 201. When receiving the operation of sharing the file by the user, the first terminal 201 displays an identifier of the terminal that has an association relationship with the first terminal 201, namely, a terminal that belongs to the same user as the first terminal 201. In this embodiment of this application, if the first terminal 201 stores the identification information of the associated terminal, a specific application scenario is as follows: A cloud server may be specifically set between the first terminal 201 and the second terminal 202. For example, the cloud server may be Dropbox or OneDive. The user may register identifiers of terminals of the user with the cloud server, to form an associated correspondence between the different terminals, and finally synchronize the correspondence to each terminal. Therefore, the first terminal 201 may obtain the identifiers of the terminals that have an association relationship with the first terminal 201.

In this application, each user may have a device group, all devices in the group belong to the user, and the user may use a cloud account to log in to the cloud server to configure the device group. For example, a user A has a mobile phone, a portable computer, and a smartwatch, and a device group corresponding to the user A may be specifically shown in the following Table 1:

TABLE 1

| Device Group of a User A |
| --- |
| Mobile phone |
| Portable computer |
| Smartwatch |

Step S22: The user may select, from a displayed identifier of at least one second terminal 202, an identifier of a second terminal 202 that the file is to be shared with.

It should be noted that when the user selects the second terminal 202 with which the user shares the file, the first terminal 201 establishes a point-to-point Bluetooth communication link to second terminal 202, and the first terminal 201 may specifically use the point-to-point communication link to transmit a first control command in step S24 and receive a second control command in step S25.

Step S23: The first terminal 201 sends a first control command to the second terminal 202 when detecting an operation of selecting the identifier of the second terminal 202 by the user.

In this embodiment of this application, the first terminal 201 may specifically send the control command to the second terminal 202 in the Bluetooth manner. If the cloud server is set between the first terminal 201 and the second terminal 202, the first terminal 201 may specifically send the first control command to the cloud server by using WiFi or a cellular network, and then the cloud server forwards the first control command to the second terminal 202.

In this embodiment of this application, the first control command may specifically include a WiFi enabling command and a MAC address (WIFIbissid1) of a WiFi hotspot in the first terminal 201. The WiFi enabling command may be used to control the second terminal 202 to enable a WiFi P2P function, and WIFIbissid1 is used to subsequently perform mutual verification with the second terminal 202.

Step S24: The second terminal 202 enables a WiFi P2P function when receiving the first control command, and sends a second control command to the first terminal 201.

In this embodiment of this application, the second terminal 202 enables the WiFi P2P function according to the WiFi enabling command in the first control command, then saves WIFIbissid1 in the first control command, generates the second control command, and sends the second control command to the first terminal 201. The second control command may specifically include a WiFi enabling command and a MAC address (WIFIbissid2) of a WiFi hotspot in the second terminal 202.

Step S25: The first terminal 201 receives the second control command, and enables a WiFi P2P function according to the second control command.

In this embodiment of this application, the first terminal 201 may enable the WiFi P2P function according to the WiFi enabling command in the second control command, and then save WIFIbissid2 in the second control command.

Step S26: The first terminal 201 establishes a WiFi communication link between the first terminal 201 and the second terminal 202.

In this embodiment of this application, the first terminal 201 may specifically use the enabled WiFi P2P function to search for a nearby terminal that enables a WiFi P2P function. The terminal that enables the WiFi P2P function periodically transmits a radio frequency signal outside. The radio frequency signal may carry a third check parameter, and the third check parameter may be specifically WIFIbissid corresponding to the terminal. In this embodiment of this application, when receiving a radio frequency signal sent by each nearby terminal, the first terminal 201 checks whether a third check parameter carried in the radio frequency signal is the same as a check parameter stored in the first terminal 201. In other words, the first terminal 201 checks whether received WIFIbissid is the same as WIFIbissid2 stored in the first terminal 201. If the received WIFIbissid is the same as WIFIbissid2 stored in the first terminal 201, the first terminal 201 determines that the second terminal 202 is valid, and sends, to the second terminal 202, a request for establishing a WiFi communication link. The request sent by the first terminal 201 for establishing the WiFi communication link also carries WIFIbissid1 of the ft first terminal 201. When receiving the request, the second terminal 202 also obtains WIFIbissid1 in the request, and then determines whether WIFIbissid1 is the same as WIFIbissid1 stored in the second terminal 202. If the two are the same, the second terminal 202 determines that first terminal 201 is valid, agrees to establish the WiFi communication link, and sends, to the first terminal 201, a WiFi communication link response. In this case, the first terminal 201 may establish the WiFi communication link to the second terminal 202.

Step S27: The first terminal 201 sends the first file to the second terminal 202 by using the established WiFi communication link.

Figure 4:
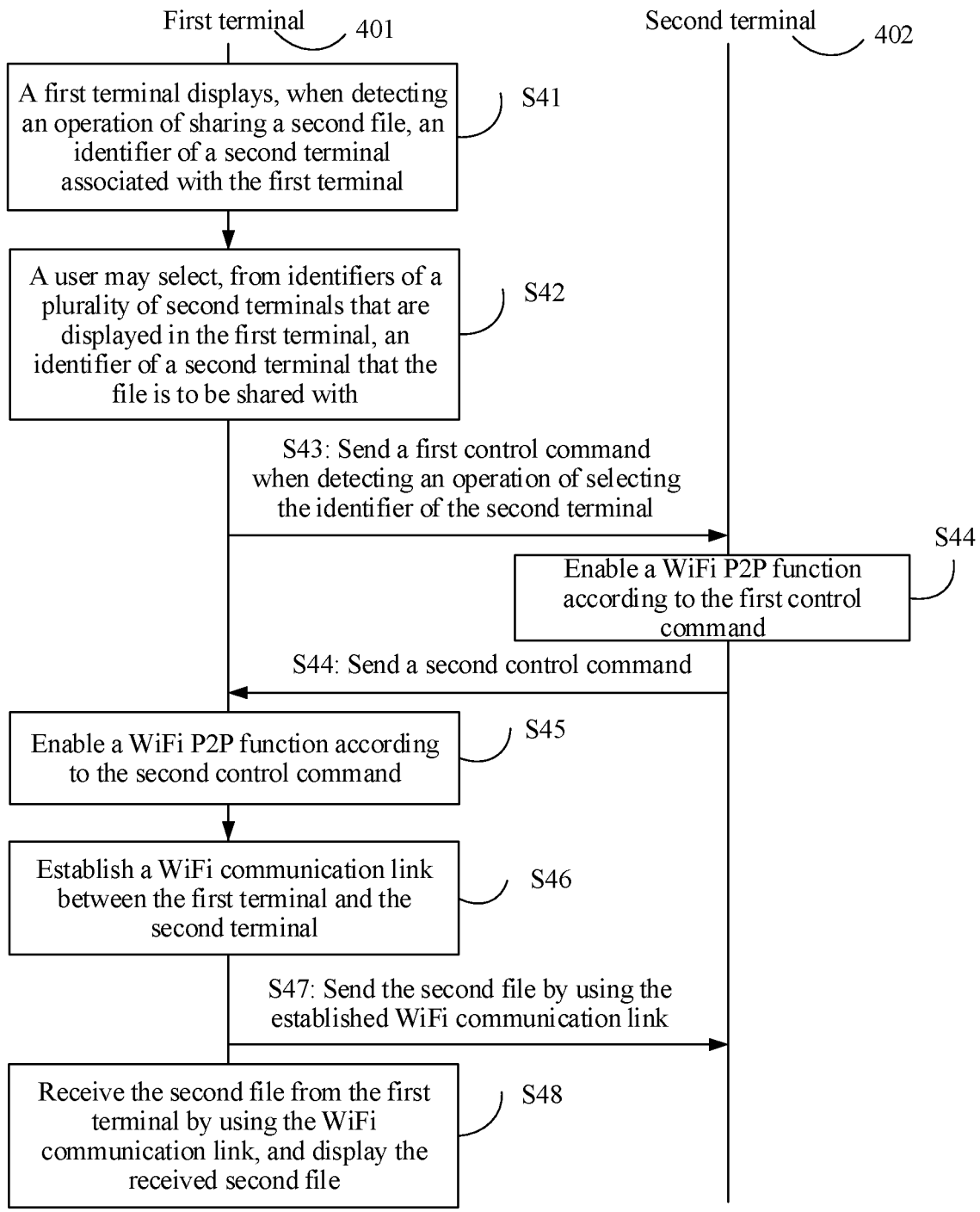
FIG. 4 is still another schematic diagram of file sharing according to an embodiment of this application.

Second case: A second file on the second terminal 402 is to be shared. As shown in FIG. 4, the method is specifically as follows:

Step S41: The first terminal 401 displays, when detecting an operation of sharing a second file, an identifier of a second terminal 402 associated with the first terminal 401.

In this application, the first terminal 401 may obtain, in a Bluetooth manner or by using a cloud server, a shared folder in a terminal that has an association relationship with the first terminal 401, namely, a shared folder of another terminal that belongs to a same user as the first terminal 401. For example, the first terminal 401, the second terminal 402, and a third terminal belong to the same user, and the first terminal 401 may obtain a shared folder of the second terminal 402 and a shared folder of the third terminal in the Bluetooth manner or by using the cloud server. Therefore, if the user wants to obtain a file on the second terminal 402 by using the first terminal 401, the user may perform, in the first terminal 401, an operation of selecting the shared folder of the second terminal 402.

Step S42: A user may select, from identifiers of a plurality of second terminals 402 that are displayed in the first terminal 401, an identifier of a second terminal 402 that the file is to be shared with.

Step S43: The first terminal 401 sends a first control command to the second terminal 402 when detecting an operation of selecting the identifier of the second terminal 402 by the user.

Step S44: The second terminal 402 enables a WiFi P2P function when receiving the first control command, and sends a second control command to the first terminal 401.

Step S45: The first terminal 401 receives the second control command, and enables a WiFi P2P function according to the second control command.

Step S46: The first terminal 401 establishes a WiFi communication link between the first terminal 401 and the second terminal 402.

For detailed descriptions of step S41 to step S46, specifically refer to the foregoing descriptions of the first case. Details are not described herein again.

Step S47: The second terminal 402 sends the second file to the f et first terminal 401 by using the WiFi communication link.

Step S48: The first terminal 401 receives the second file from the first terminal 401 by using the WiFi communication link, and displays the received second file.

In this embodiment of this application, the second file may be sent in a plurality of different manners. In a manner, the second terminal 402 sends a list of second files to the first terminal 401 by using the WiFi communication link, and the first terminal 401 receives the list of second files, and displays the list of second files in a shared folder corresponding to the first terminal 401. In this case, the user may select to view the second file online or download the second file. If the user selects to view the second file online, the first terminal 401 may specifically serve as a client in a C/S (client/server) mode, the second terminal 402 may specifically serve as a server in the C/S mode, and the first terminal 401 may view the second file on the second terminal 402 online in the C/S mode in the prior art. If the user selects to download the second file, the second terminal 402 may specifically send the second file to the first terminal 401 by using the WiFi communication link, and the first terminal 401 displays the second file in the corresponding shared file when receiving the second file, facilitating viewing of the user.

It may be learned from the foregoing that in this embodiment of this application, when the user needs to share the file in the WiFi P2P manner, the user needs to perform operations of only two steps of performing file sharing and selecting a terminal to be shared with (namely, the second terminal 402), and the first terminal 401 and the second terminal 402 may automatically enable the WiFi point-to-point function and establish the WiFi communication link. Therefore, operation steps of the user can be reduced, and user experience can be improved by using the method in this application compared with the prior art in which a user needs to perform operations of seven steps each time the user shares a file by using a WiFi P2P function.

Embodiment 2

This application further provides a method for sharing a file between different terminals. The method may be specifically used to share a first file in a first terminal 401. In the method, a Bluetooth manner may be specifically used to transmit a control command used to establish a WiFi communication link. The Bluetooth manner may be specifically a standard Bluetooth manner in the prior art, or may be specifically a BLE manner. Because signal transmit power is relatively low, an electricity quantity of the terminal can be saved when the control command is transmitted in the BLE manner.

Before the method in this embodiment is described in detail, a premise of the method in this application is first described. First, an account is pre-allocated to each user, the account may be used to uniquely identify the user, and each terminal of the user stores the account. For example, a user has three terminals: a mobile phone, a tablet computer, and a smartwatch respectively, and an account allocated to the user is 123ABC; therefore, the account 123ABC of the user is stored in each of the mobile phone, the tablet computer, and the smartwatch of the user. More specifically, an application program used to share a file may be installed in each terminal of the user, the user can log in to the application program by using a pre-allocated account, and a user identifier may be specifically stored in login information of the application program.

Figure 5A:
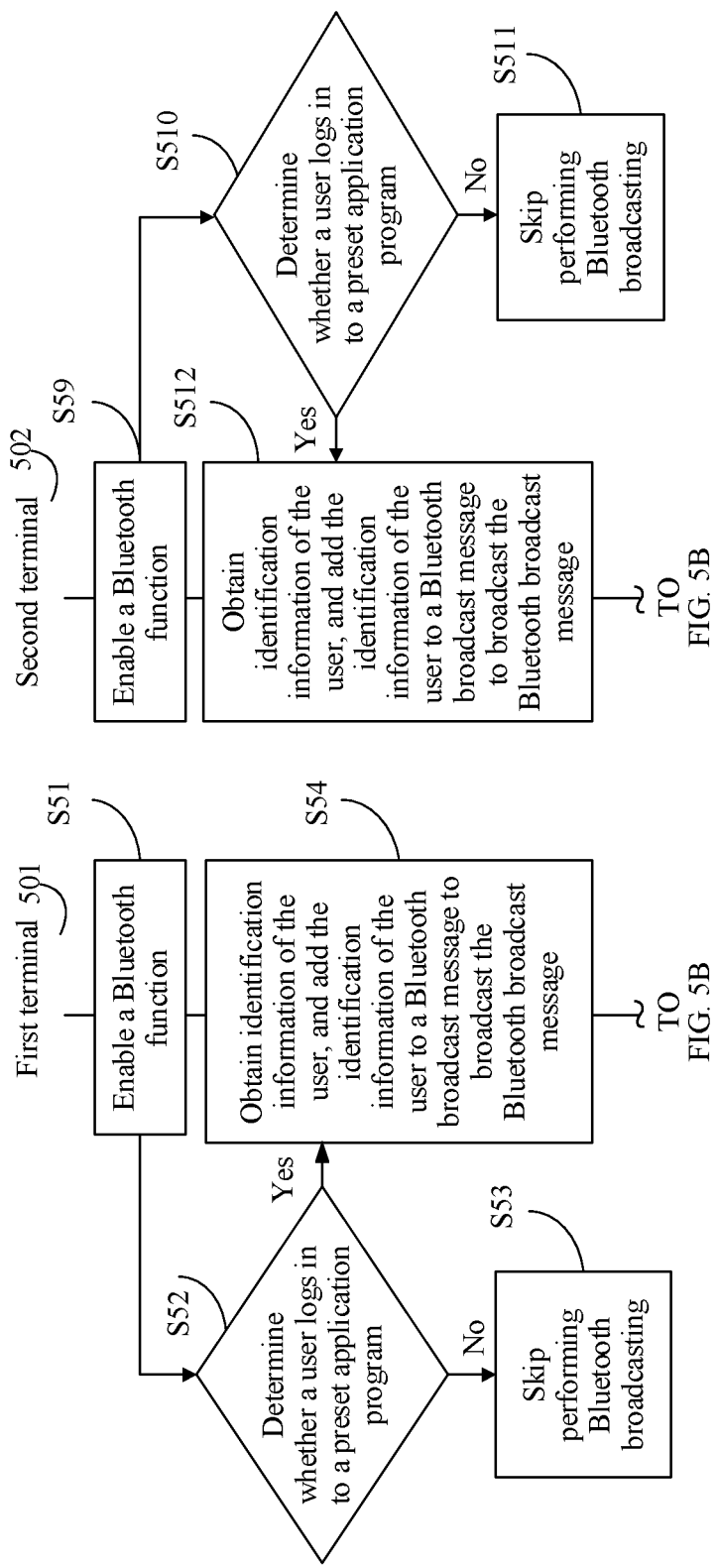
FIG. 5A.
Figure 5B:
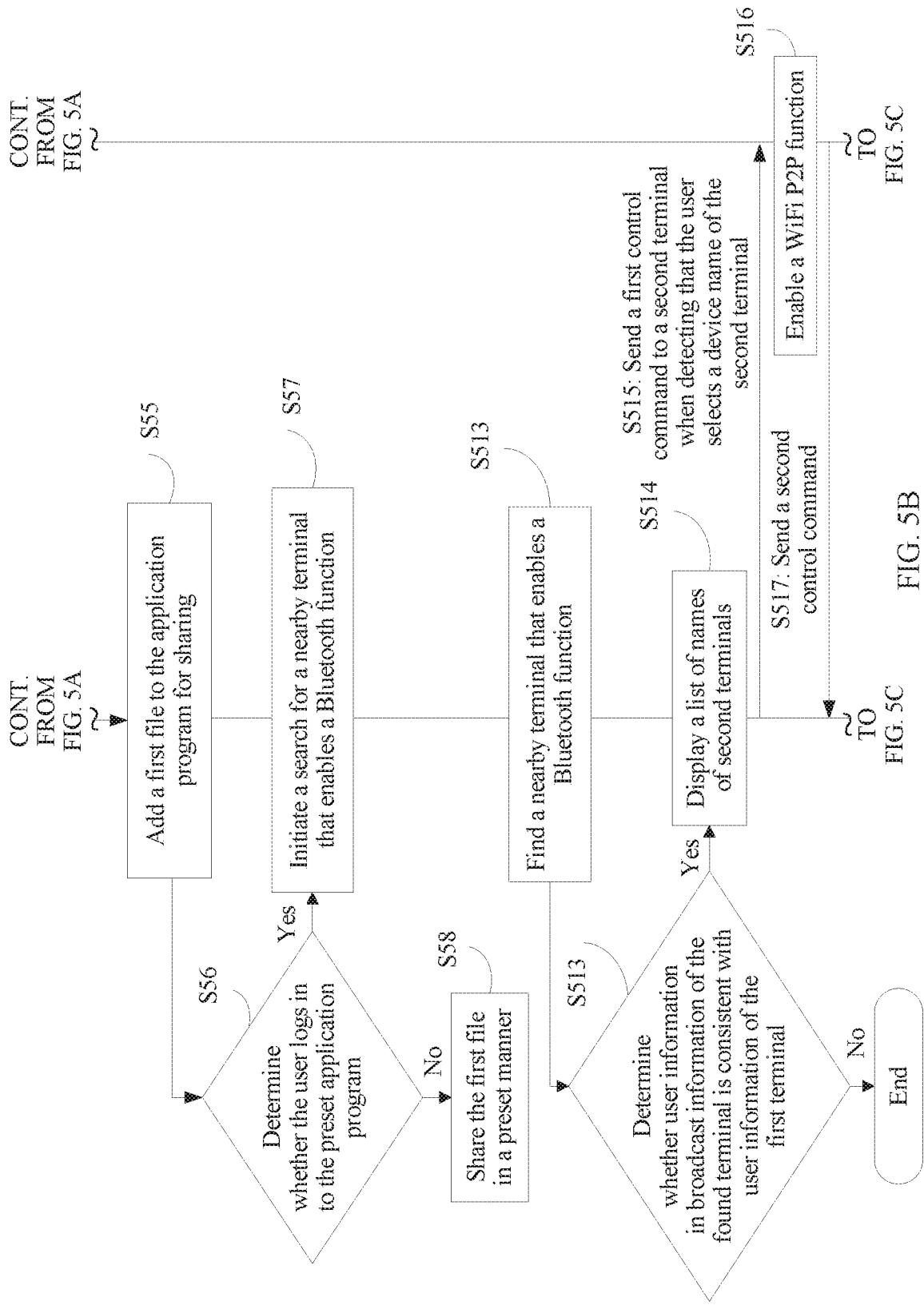
FIG. 5B, and FIG. 5C are yet another schematic diagram of file sharing according to an embodiment of this application.
Figure 5C:
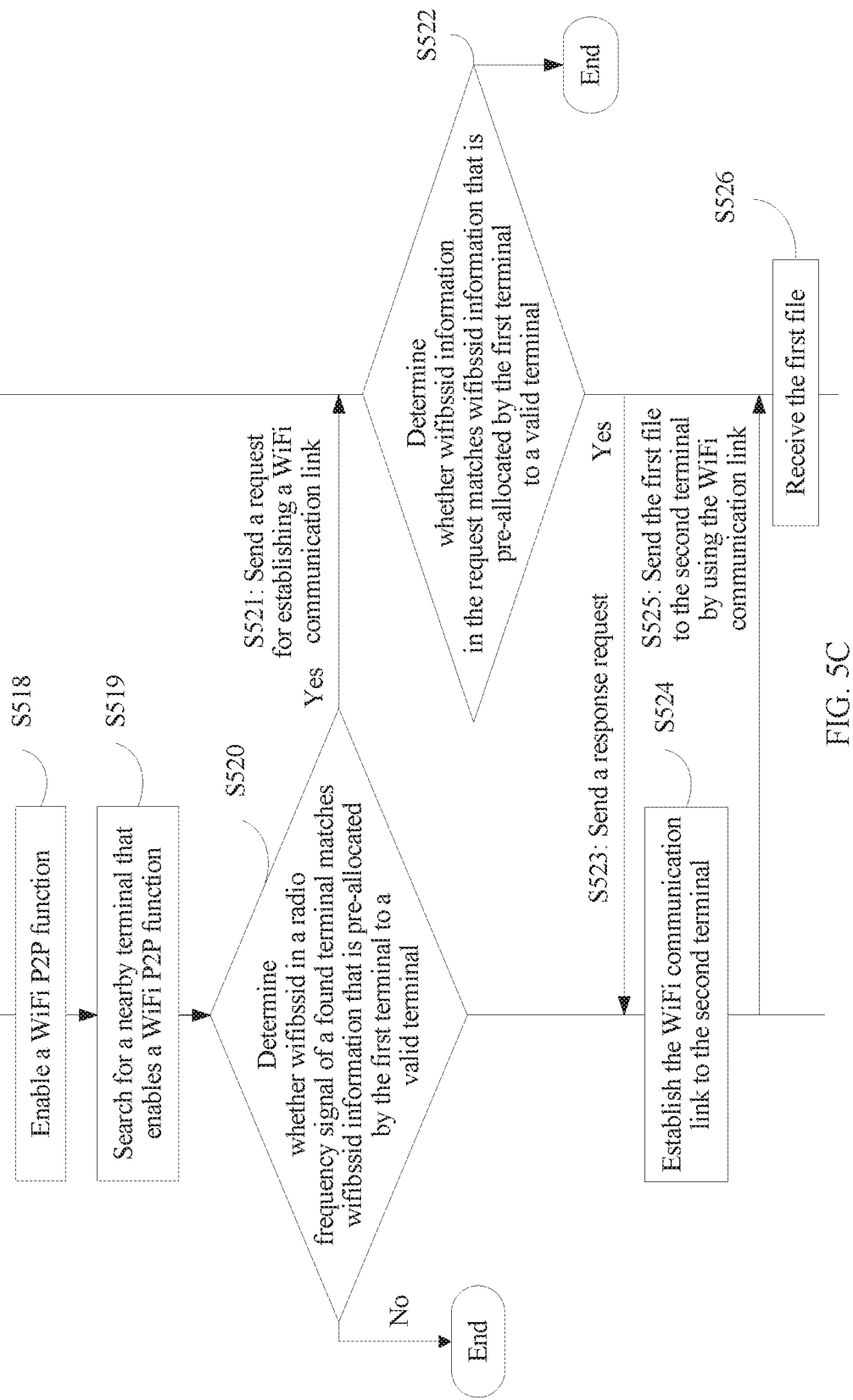

The following describes in detail the method provided in this embodiment of this application. As shown in FIG. 5A, FIG. 5B, and FIG. 5C, the method is specifically as follows:

Step S51: The first terminal 501 enables a Bluetooth function.

Step S52: first terminal 501 determines whether a user logs in to a preset application program, where the preset application program may be specifically the application program used to share a file. If the user does not log in to the preset application program, step S53 is performed; or if the user logs in to the preset application program, step S54 is performed.

Step S53: The first terminal 501 disables Bluetooth broadcasting.

In this application, that the user logs in to the preset application program is actually performing a file sharing operation by the user, and when the terminal does not detect an operation of logging in to the preset application program by the user, it may be considered that the user does not want to perform file sharing in this case; therefore, there is no need to perform Bluetooth broadcasting. In a common case, the first terminal 501 performs Bluetooth broadcasting once the first terminal 501 enables the Bluetooth function. Therefore, when it is determined in step S52 that the user does not perform the file sharing operation, Bluetooth broadcasting needs to be disabled.

Step S54: The first terminal 501 obtains identification information of the user, and adds the identification information of the user to a Bluetooth broadcast message to broadcast the Bluetooth broadcast message.

In this embodiment of this application, the first terminal 501 may specifically obtain the identification information of the current login user from the login information in the application program used to share a file.

Step S55: The user adds a to-be-shared file (which is referred to as a first file below for ease of description) to the application program for sharing.

In this embodiment of this application, the user may add the first file to the application program, and then tap a sharing icon to share the first file, and a specific sharing manner of the first file may be shown in FIG. 3.

Step S56: The first terminal 501 determines whether the user logs in to the preset application program. If the user logs in to the preset application program, step S57 is performed; or if the user does not log in to the preset application program, step S58 is performed.

Step S57: The first terminal 501 initiates a search for a nearby terminal that enables a Bluetooth function.

Step S58: The first terminal 501 transmits the first file to a second file by using a short-distance link. It should be noted that the short-distance link may be specifically established by using a Bluetooth protocol, a WiFi P2P protocol, or an NFC (Near Field Communication, Near Field Communication) protocol. In this embodiment of this application, because the first terminal 501 transmits, to a second terminal 502 in a Bluetooth manner, a control command used to establish a WiFi communication link, the first terminal 501 and the second terminal 502 both need to enable a Bluetooth function. It may be learned from the descriptions of step S51 to step S58 that the first terminal 501 may search for a nearby terminal that enables a Bluetooth function. In this embodiment of this application, if the first terminal 501 needs to transmit, to the second terminal 502 in the Bluetooth manner, the control command used to establish the WiFi communication link, the second terminal 502 also needs to enable a Bluetooth function. In this embodiment of this application, a processing process of the second terminal 502 includes the following steps:

Step S59: The second terminal 502 enables a Bluetooth function.

Step S510: The second terminal 502 determines whether a user logs in to a preset application program. If the user does not log in to the preset application program, step S511 is performed; or if the user logs in to the preset application program, step S512 is performed. Same as above, the preset application program may be specifically the application program used to share a file.

Step S511: The second terminal 502 disables Bluetooth broadcasting.

Step S512: The second terminal 502 obtains identification information of the user, and adds the identification information of the user to a Bluetooth broadcast message to broadcast the Bluetooth broadcast message.

In this embodiment of this application, the first terminal 501 may specifically obtain the identification information of the current login user from the login information in the application program used to share a file.

Step S513: When finding a nearby terminal that enables a Bluetooth function, the first terminal 501 determines whether user information in broadcast information of the found terminal is consistent with user information of the first terminal 501. If the user information in the broadcast information of the found terminal is consistent with the user information of the first terminal 501, the first terminal 501 determines that the two terminals belong to a same user (each terminal that is found and that belongs to the same user as the first terminal 501 is referred to as a second terminal 502 for ease of description below), and performs step S514; or if the user information in the broadcast information of the found terminal is inconsistent with the user information of the first terminal 501, the procedure ends.

Step S514: The first terminal 501 displays a list of identifiers of second terminals 502.

Step S515: The first terminal 501 sends a first control command to a second terminal 502 when detecting that the user selects a device name of the second terminal 502, where the first control command may specifically include cmd and WIFIbssid1.

Step S516: The second terminal 502 enables a WiFi P2P function when receiving the first control command.

In this embodiment of this application, the second terminal 502 may specifically enable the WiFi P2P function according to a WiFi enabling command in the first control command, and then save WIFIbssid1 in the first control command. Step S517: The second terminal 502 sends a second control command to the first terminal 501.

In this embodiment of this application, the second control command may specifically include cmd and WIFIbssid2.

Step S518: The first terminal 501 enables a WiFi P2P function according to cmd in the second control command, and saves WIFIbssid2 in the second control command.

In this embodiment of this application, more specifically, the second control command may alternatively include cmd, WIFIbssid2, and a user identifier of the second terminal 502. When receiving the second control command, the second terminal 502 may first determine whether the user identifier in the second control command is the same as a user identifier of the second terminal 502. If the user identifier in the second control command is the same as the user identifier of the second terminal 502, the first terminal 501 determines that the second terminal 502 and the first terminal 501 (namely, the first terminal 501) belong to a same user, continues to enable the WiFi P2P function according to cmd in the second control command, and saves WIFIbssid2 in the second control command.

Step S519: The first terminal 501 searches for a nearby terminal that enables a WiFi P2P function.

In the prior art, when a terminal enables a WiFi P2P function, the terminal sends a radio frequency signal outside, and the radio frequency signal may specifically include WIFIbssid information. In this embodiment of this application, a radio frequency signal sent by the first terminal 501 may specifically include WIFIbssid2, and a radio frequency signal sent by the second terminal 502 may specifically include WIFIbssid1 information pre-allocated by the first terminal 501.

Step S520: The first terminal 501 determines whether WIFIbssid in a radio frequency signal of a found terminal matches WIFIbssid information that is pre-allocated by the first terminal 501 to a valid terminal. If WIFIbssid in the radio frequency signal of the found terminal matches WIFIbssid information that is pre-allocated by the first terminal 501 to the valid terminal, step S521 is performed; or if WIFIbssid in the radio frequency signal of the found terminal does not match WIFIbssid information that is pre-allocated by the first terminal 501 to the valid terminal, the procedure ends.

Step S521: The first terminal 501 sends, to the second terminal 502, a request for establishing a WiFi communication link.

Specifically, in this embodiment of this application, the request sent by the first terminal 501 for establishing the WiFi communication link may specifically include WIFIbssid2 information pre-allocated to the second terminal 502.

Step S522: When receiving the request, the second terminal 502 determines whether WIFIbssid information in the request matches WIFIbssid information that is pre-allocated by the first terminal 501 to a valid terminal. If the WIFIbssid information in the request matches the WIFIbssid information that is pre-allocated by the first terminal 501 to the valid terminal, step S523 is performed; or if the WIFIbssid information in the request does not match the WIFIbssid information that is pre-allocated by the first terminal 501 to the valid terminal, the procedure ends.

Step S523: The second terminal 502 sends a response request to the first terminal 501.

Step S524: The first terminal 501 establishes the WiFi communication link to the second terminal 502 when receiving the response request.

Step S525: The first terminal 501 sends the first file to the second terminal 502 by using the WiFi communication link.

Step S526: The second terminal 502 receives the first file by using the WiFi communication link.

Figure 6:
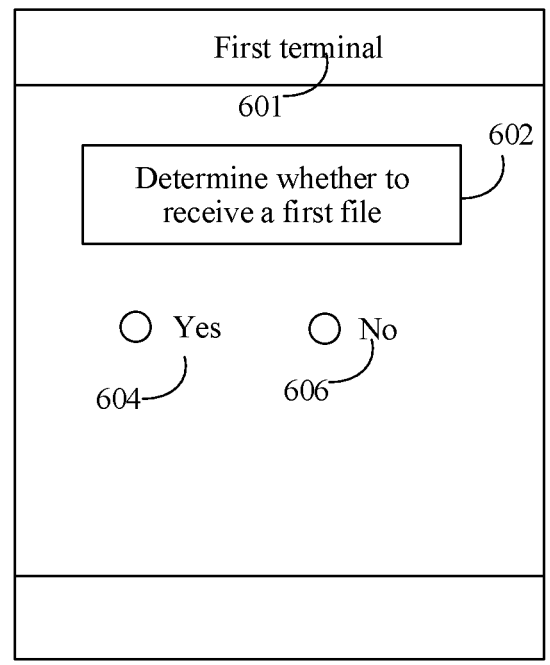
FIG. 6 is a schematic diagram of receiving a first file by a second terminal according to an embodiment of this application.

In this embodiment of this application, the second terminal 502 may directly receive the first file by using a background, or may pop up a prompt box when receiving the first file, to prompt the user whether to receive the first file. After the user selects to receive the first file, the second terminal 502 receives the first file. In this embodiment of this application, the prompt box indicating the first terminal 601 and a message 602 with options (Yes 604 and No 606) to whether or not receive the first file, may be specifically shown in FIG. 6.

It may be learned from the foregoing that in this embodiment of this application, because most terminals enable a Bluetooth function in normal use, when the first file is specifically shared, the user usually does not need to enable the Bluetooth function purposely. Therefore, when the foregoing file sharing manner is used, the user needs to perform operations of only two steps of selecting the first file for sharing and selecting the second terminal 502. It may be learned that when the foregoing file sharing manner is used, an operation process of the user is reduced, and user experience is improved compared with seven steps in the prior art.

Embodiment 3

This application further provides a method for sharing a file between different terminals. The method may be specifically used to share a first file in a first terminal 501. An application environment of this application is first described.

Figure 7:
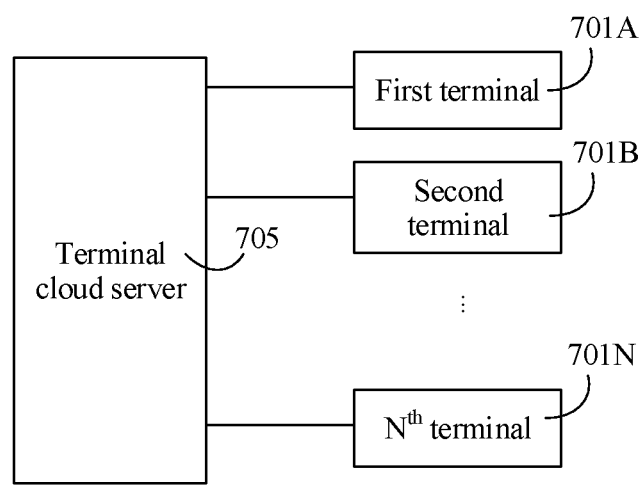
FIG. 7 is a schematic diagram of a multi-terminal system according to an embodiment of this application.

As shown in FIG. 7, this application further provides a system for sharing a file between different terminals. The system includes a terminal cloud server 705 and a plurality of terminals 701A, 701B, . . . , 701N. The plurality of terminals 701A, 701B, . . . , 701N may be specifically different terminals of a same user, and may be respectively a first terminal 701A, a second terminal 701B, a third terminal, . . . , and an Nth terminal 701N, where N is an integer.

In this embodiment of this application, a user may register with the terminal cloud server 705 by using a terminal, and then submit a status of a quantity of terminals owned by each user. The terminal cloud server 705 may establish an association relationship between different terminals based on a registration status of the user, and synchronize the association relationship to each terminal.

For example, a user registers, with the terminal cloud server 705, three terminals of the user, which are respectively a first terminal 701A, a second terminal 701B, and a third terminal; and the terminal cloud server 705 establishes an association relationship between the first terminal 701A, the second terminal 701B, and the third terminal, and then synchronizes the association relationship to each of the first terminal 701A, the second terminal 701B, and the third terminal.

In this embodiment of this application, for ease of description, an example in which a user shares a first file on the first terminal 701A may be specifically used to describe a process of this application in detail.

Figures 8, 9:
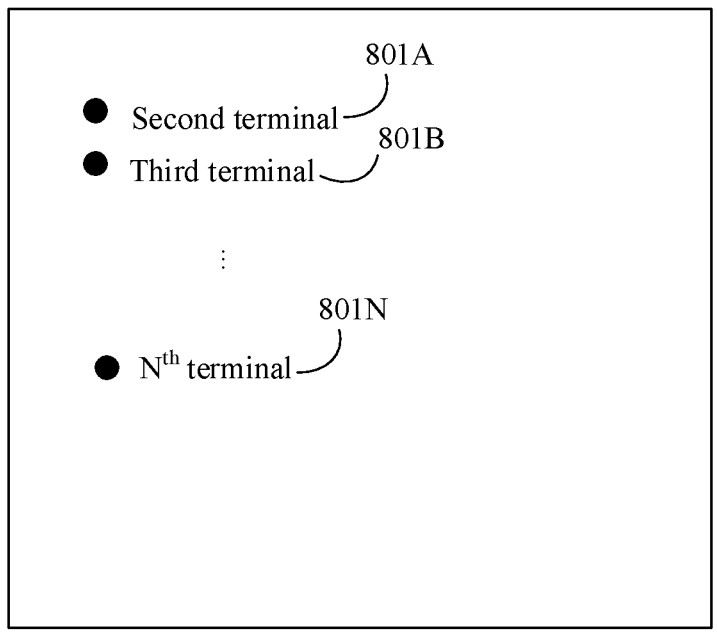
FIG. 8 is a schematic diagram of a list of names of second terminals according to an embodiment of this application.
FIG. 9 is a schematic diagram of an association relationship according to an embodiment of this application.

In this embodiment of this application, the user may first perform a sharing operation on the first file on the first terminal 701A. For details of the sharing operation, still refer to FIG. 3. The first terminal 701A displays a list of names of terminals that have an association relationship with the first terminal 701A, which are respectively a second terminal 801A, a third terminal 801B, . . . , and an Nth terminal 801N, and a specific list may be shown in FIG. 8. When the user selects the second terminal 801A for file sharing, the first terminal 701A sends a first control command to the terminal cloud server 705. The terminal cloud server 705 forwards the first control command to the second terminal 701B. The second terminal 701B enables a WiFi P2P function according to the first control command, and the second terminal 701B sends a second control command to the terminal cloud server 705. The terminal cloud server 705 forwards the second control command to the first terminal 701A, and the first terminal 701A enables a WiFi P2P function according to the second control command. In this case, the first terminal 701A and the second terminal 701B establish a WiFi communication link based on the respective enabled WiFi P2P function, and the first terminal 701A sends the first file to the second terminal 701B by using the WiFi communication link.

Specifically, with development of an eSIM (embedded SIM) card, the service has become increasingly popular. The method provided in this embodiment of this application may be specifically applied to the eSIM card. Details are as follows:

An eSIM card technology is first described. A concept of the eSIM card is to directly embed a conventional SIM card into a device chip of a terminal rather than add the conventional SIM card to a device as an independent and removable component. However, the eSIM card of the terminal may be specifically an empty card at an initial delivery stage of the terminal. When a user obtains the terminal, the user may specifically submit an application to a corresponding server, and then the corresponding server writes related information into the eSIM card based on the application of the user.

In this embodiment of this application, a plurality of terminals of a user each may use the eSIM card. Then, an eSIM card of a terminal is set as a primary card, and an eSIM card of a remaining terminal is set as a secondary card. Then, an association relationship between a primary card terminal and a secondary card terminal is established and stored in a cloud terminal server. Finally, the cloud terminal server synchronizes the association relationship to each terminal. It should be noted that in actual application, if a user has a plurality of terminals, usually, an eSIM card in a mobile phone terminal of the user is set as a primary card, and eSIM cards in a smartwatch and a tablet computer are set as secondary cards. In this embodiment of this application, it is assumed that a user has three terminals: a first terminal, a second terminal, and a third terminal respectively. For an association relationship established between the three terminals, specifically refer to FIG. 9 that illustrates Device IMSI number 901 (e.g., ***901A, ***901B,

***901C). Device SIM card number 902 (e.g., *902A, *902B, ***902C). Device name 903 (e.g., First terminal 903A, Second terminal 903B. Third terminal 903C), and Primary card/secondary card 904 (e.g., Primary card 904A. Secondary card 904B. Secondary card 904C).

It should be further noted that for a plurality of terminals of a user, a primary device may use a SIM card, and a secondary device may use an eSIM card, or even all devices of the user may use SIM cards.

In this embodiment of this application, still in the foregoing example, for example, the user has the three terminals. A multi-terminal management application program may be specifically installed in each of the three terminals, and the application program stores the association relationship between the three terminals. For the association relationship, still refer to FIG. 9.

Figure 10:
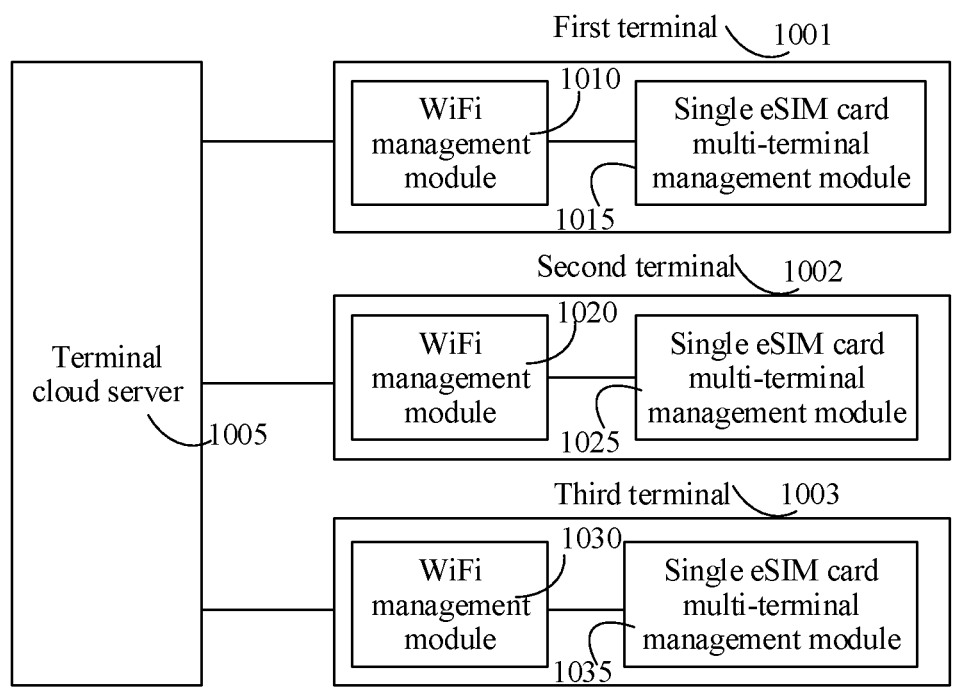
FIG. 10 is a schematic diagram of another multi-terminal system according to an embodiment of this application.

In this embodiment of this application, as shown in FIG. 10, a single eSIM card multi-terminal management module 1015, 1025, 1035 and a WiFi management module are disposed in each terminal 1001, 1002, 1003, the single eSIM card multi-terminal management module 1015, 1025, 1035 stores an association relationship between a plurality of terminals, and the WiFi management module 1010, 1020, 1030 is configured to manage enabling of a WiFi P2P function and establish a WiFi communication link. The first terminal 1001 may obtain, by using the single eSIM card multi-terminal management module 1015, a list of identifiers of second terminals that perform a same Multiple IMSI Single MSISDN service with the terminal. That the first terminal 1001 obtains, when detecting a file sharing operation, a list of second terminals that have an association relationship with the first terminal 1001 may be specifically: when detecting the file sharing operation, obtaining, by the first terminal 1001 from a preset server, the list of identifiers of the second terminals that perform the same Multiple IMSI Single MSISDN service with the first terminal 1001. The preset server may be specifically a cloud server associated with the terminal, such as a Huawei cloud server or a Baidu cloud server, or may be a server that manages a Multiple IMSI Single MSISDN service, such as an eSIM server that manages a Multiple IMSI Single MSISDN service.

The Multiple IMSI Single MSISDN service is a service that one mobile station international ISDN number MSISDN (Mobile Station International ISDN Number) corresponds to a plurality of international mobile subscriber identity IMSI (International Mobile Subscriber Identity) numbers. In other words, a plurality of mobile terminals may use different SIM cards but share one MSISDN number. When these mobile terminals serve as called parties, a service procedure of the mobile terminals is classified into two procedures: mobile access hunting (Mobile Access Hunting, MAH) and flexible alerting (Flexible Alerting, FA).

FA procedure: A user dials an FA pilot number, and a system rings all called terminals. When any one of the called terminals answers, the system immediately stops ringing the other called terminals. For example, a phone number of a mobile terminal A is bound to a phone number of a mobile terminal B, and the phone number of the mobile terminal A is set as the FA pilot number. When the user dials the pilot number, the registered mobile terminals A and B ring simultaneously. The ringing mobile terminals A and B herein are referred to as members. After one member answers, the other member stops ringing. The FA pilot number may be a member number of a member piloted by the FA pilot number, or may be a virtual n umber.

MAH procedure: The user dials an MAH pilot number, and the system first rings a first called terminal in a ringing sequence set by a called user in a home location register (HLR, Home Location Register). If the first called terminal is not connected, the system rings a next called terminal in sequence until one called terminal answers. Similarly, the MAH pilot number may be a member number of a member piloted by the MAH pilot number, or may be a virtual number.

In this embodiment of this application, when the user needs to share the first file on the first terminal 1001, the first terminal 1001 may obtain, by using the cloud terminal server, a status of whether the first terminal 1001 activates a Multiple IMSI Single MSISDN service, and then determine whether the first terminal 1001 activates the Multiple IMSI Single MSISDN service. If the Multiple IMSI Single MSISDN service is not activated, the first terminal 1001 shares the first file in a manner in the prior art, for example, in a manner of Bluetooth or NFC in the prior art; or if the first terminal 1001 activates the Multiple IMSI Single MSISDN service, the first terminal 1001 displays the list of names of the terminals that have an association relationship with the first terminal 1001. Then, when the user selects a terminal name from the list, for ease of description, a terminal selected by the user is referred to as a second terminal 1002, and the first terminal 1001 sends a first control command to the second terminal 1002 by using the terminal cloud server 1005. The second terminal 1002 enables a WiFi P2P function according to the first control command, and sends a second control command to the first terminal 1001 by using the cloud server. Correspondingly, the first terminal 1001 enables a WiFi P2P function according to the second control command. In this case, the first terminal 1001 enables a search function, to search for a nearby terminal that enables a WiFi P2P function. It should be noted that in this embodiment of this application, when the first terminal 1001 and the second terminal 1002 enable the WiFi P2P function, the first terminal 1001 and the second terminal 1002 each send a radio frequency signal outside. The radio frequency signal includes an IMEI (International Mobile Equipment Identity, international mobile equipment identity) of a corresponding terminal. When receiving a radio frequency signal from a nearby device, the first terminal 1001 determines whether an IMEI included in the radio frequency signal is included in a correspondence (for the correspondence, specifically refer to FIG. 9). If the IMEI included in the radio frequency signal is included in the correspondence, the first terminal 1001 sends, to the terminal, namely, the second terminal 1002, a request for establishing a WiFi communication link, and the request also carries an IMEI of the first terminal 1001. When receiving the request, the second terminal 1002 determines whether the IMEI in the request is included in a correspondence. If the IMEI in the request is included in the correspondence, the second terminal 1002 sends a response message to the first terminal 1001. In this case, the first terminal 1001 establishes the WiFi communication link to the second terminal 1002, and transmits the first file to the second terminal 1002 by using the WiFi communication link.

It should be noted that in actual application, if the first terminal 1001 is a primary card device such as a smartphone, an application program for managing a secondary card device is usually installed in the primary card device. For example, an application program for managing a wearable device is usually installed in a smartphone. However, the primary card device may communicate with the secondary card device by using the application program for managing the secondary card device. Therefore, in actual application, in addition that a control command used to establish the WiFi communication link is transmitted by using the terminal cloud server 1005, the control command used to establish the WiFi communication link may be transmitted by using the application program for managing the secondary card device.

It may be learned from the foregoing that in this embodiment of this application, the user needs to perform only two operations of sharing the first file and selecting the second terminal 1002. Therefore, operations of the user can be reduced, and user experience can be improved compared with seven steps in the prior art that include enabling a WiFi P2P function.

Embodiment 4

This application further provides a method for logging in to a network in a relay manner. An application scenario of this application is first described.

With rapid development of the Internet, wearable devices emerge. The wearable device is a portable device such as a smartwatch or a smart band that can be directly worn by a user. Generally, a SIM card is installed in most wearable devices, and the user can access a network by using the wearable device. Currently, due to a limitation of the wearable device in volume, a process of accessing the network by using the wearable device mainly has the following problems: A battery is small and a standby time is short; and the wearable device can support only a single antenna, and it takes more time to send a same amount of data than a multi-antenna device. In most application scenarios, a high-performance terminal such as a smartphone exists around the wearable device. Therefore, to resolve the foregoing problems in a network access process of the wearable device, related technical personnel provide a technical solution in which the wearable device accesses a network by using a terminal as a relay. In this solution, how to implement one-click network access for a user is an urgent problem that needs to be resolved currently.

Figure 11:
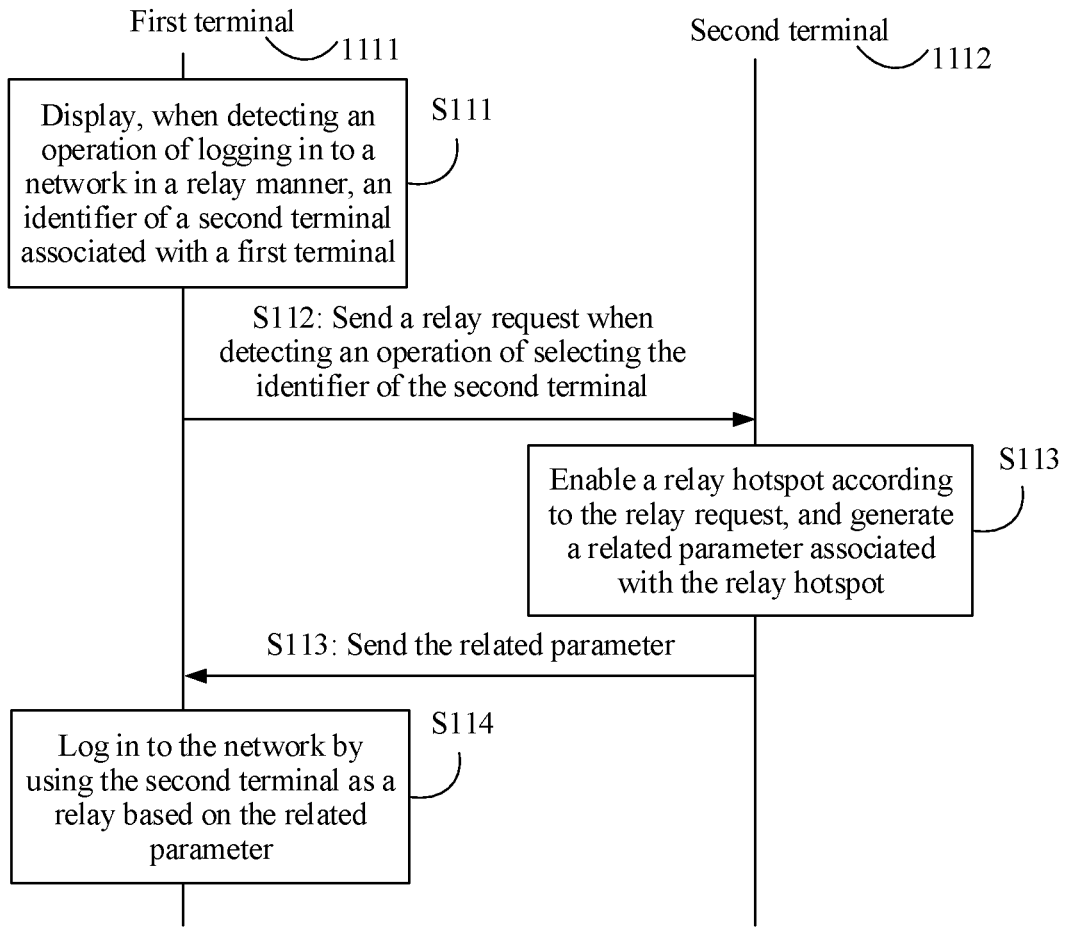
FIG. 11 is a schematic diagram of logging in to a network in a relay manner according to an embodiment of this application.

Based on the foregoing description, this application provides the following method for logging in to a network in a relay manner. As shown in FIG. 11, the method is specifically as follows:

Step S111: A first terminal 1111 displays, when detecting an operation of logging in to a network in a relay manner, an identifier of a second terminal 1112 associated with the first terminal 1111.

In this embodiment of this application, a "one-click network access" icon may be specifically set on the first terminal 1111, and when the icon receives a trigger operation, it may be considered that the first terminal 1111 detects the operation of logging in to the network in the relay manner.

Step S112: The first terminal 1111 sends a relay request to the second terminal 1112 when detecting an operation of selecting the identifier of the second terminal 1112.

In this embodiment of this application, the first terminal 1111 may specifically send a first control command to the second terminal 1112 when detecting that a user selects the identifier of the second terminal 1112. The second terminal 1112 enables a WiFi point-to-point function according to the first control command, and sends a second control command to the first terminal 1111. The first terminal 1111 receives the second control command, and enables a WiFi point-to-point function according to the second control command. The first terminal 1111 establishes a WiFi communication link to the second terminal 1112 based on the WiFi point-to-point function of the first terminal 1111 and the WiFi point-to-point function of the second terminal 1112. The first terminal 1111 sends the relay request by using the WiFi communication link.

Alternatively, the first terminal 1111 may specifically send the relay request to the second terminal 1112 in a Bluetooth manner when detecting that the identifier of the second terminal 1112 is selected.

Step S113: The second terminal 1112 enables a relay hotspot according to the relay request, generates a related parameter associated with the relay hotspot, and sends the related parameter to the first terminal 1111.

In this embodiment of this application, the related parameter associated with the relay hotspot may specifically include a name of the relay hotspot enabled by the second terminal 1112 and a hotspot password.

Step S114: When receiving the related parameter, the first terminal 1111 logs in to the network by using the second terminal 1112 as a relay based on the related parameter.

In this embodiment of this application, the first terminal 1111 may specifically receive the related parameter by using the WiFi communication link or in the Bluetooth manner.

After receiving the related parameter, the first terminal 1111 may specifically search for the corresponding relay based on the name of the relay hotspot in the related parameter, and log, based on the hotspot password, in to a network provided by the first terminal 1111.

In the foregoing manner, the user can log in to the network in the relay manner at one click. This facilitates use for the user.

Embodiment 5

Figure 13:
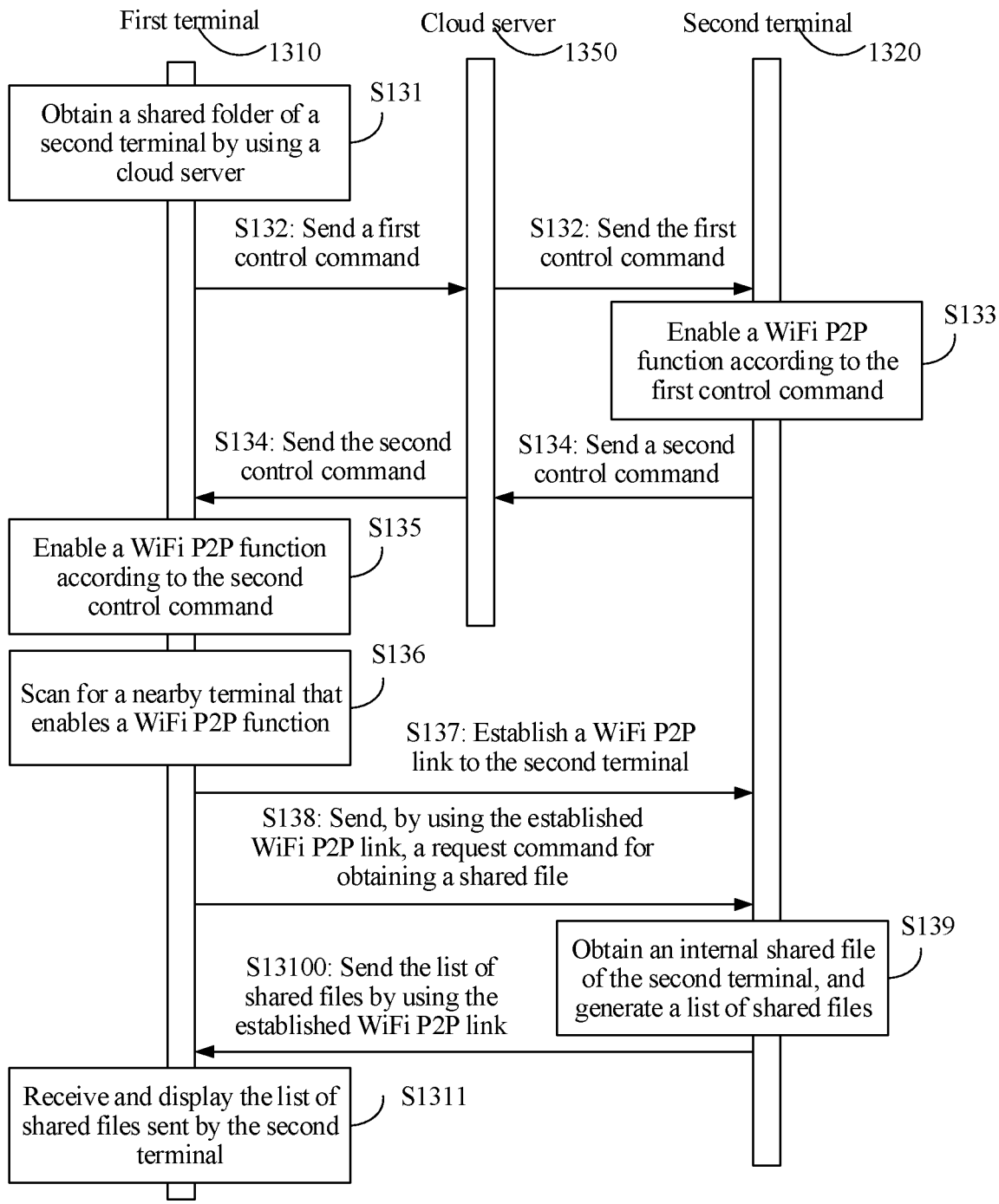
FIG. 13 is still yet another schematic diagram of file sharing according to an embodiment of this application.

In this application, as shown in FIG. 13, a process of this application is described in detail by using an example in which a first terminal 1310 obtains a shared file in a second terminal 1320.

Step S131: The first terminal 1310 obtains a shared folder of the second terminal 1320 by using a cloud server 1350.

Step S132: The first terminal 1310 sends a first control command to the second terminal 1320 by using the cloud server 1350 when detecting that the shared folder of the second terminal 1320 receives a trigger operation.

Step S133: The second terminal 1320 enables a WiFi P2P function according to the first control command.

Step S134: The second terminal 1320 sends a second control command to the first terminal 1310 by using the cloud server 1350.

Step S135: The first terminal 1310 enables a WiFi P2P function according to the second control command.

Step S136: The first terminal 1310 scans for a nearby terminal that enables a WiFi P2P function.

Step S137: When finding the second terminal 1320, the first terminal 1310 establishes a WiFi P2P link to the second terminal 1320.

Step S138: The first terminal 1310 sends a request command for obtaining a shared file to the second terminal 1320 by using the established WiFi P2P link.

Step S139: The second terminal 1320 obtains an internal shared file of the second terminal 1320, and generates a list of shared files.

Step S13100: The second terminal 1320 sends the list of shared files to the first terminal 1310 by using the established WiFi P2P link.

Step S1311: The first terminal 1310 receives and displays the list of shared files sent by the second terminal 1320.

In this application, after the first terminal 1310 displays the list of shared files, a user may perform the following at least two operations on the list of shared files. A first operation is viewing the shared file online. In this manner, the first terminal 1310 may serve as a client in a C/S mode, and the second terminal 1320 may serve as a server in the C/S mode. The first terminal 1310 may send an online viewing request to the second terminal 1320, and the user can view the file of the second terminal 1320 on a side of the first terminal 1310 after the second terminal 1320 accepts the request. A second operation is downloading the shared file. In this manner, the first terminal 1310 may send a download request to the second terminal 1320. When receiving the download request, the second terminal 1320 may send the shared file to the first terminal 1310 by using the established WiFi P2P link.

It should be noted that in this application, the second terminal 1320 may further specifically upload a shared file to a shared folder in the first terminal 1310 by using the cloud server 1350, and directly download a shared file from the shared folder.

It may be learned that in this application, the user performs, in the first terminal 1310, an operation on the shared folder of the second terminal 1320, to obtain the shared file on the second terminal 1320, so that the user can view the shared file on the second terminal 1320 on the side of the first terminal 1310. This is convenient for the user to obtain the shared file.

Embodiment 6

Figure 14:
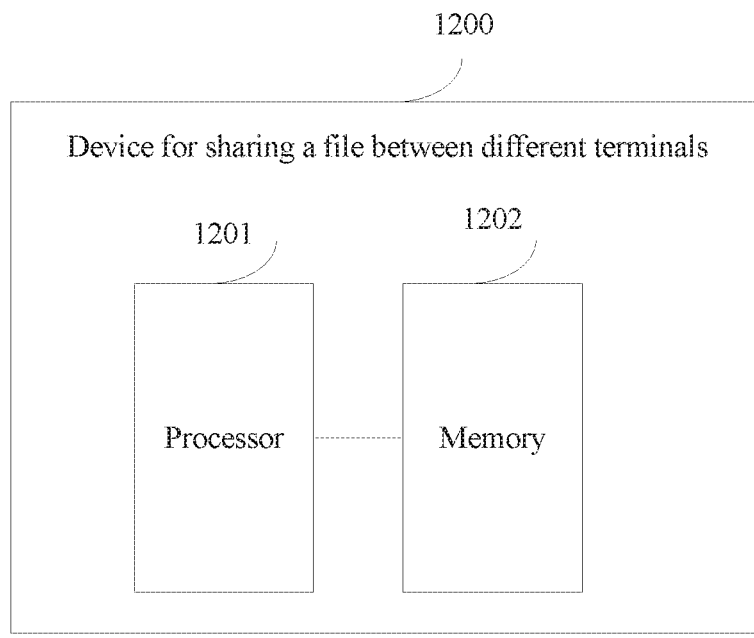
FIG. 14 is a schematic structural diagram of a device for sharing a file between different terminals according to an embodiment of this application.

Same as the foregoing concept, as shown in FIG. 14, this application further provides a device 1200 for sharing a file between different terminals. The device includes a processor 1201 and a memory 1202.

The processor 1201 is configured to read code in the memory 1202 so as to: display, when detecting a file sharing operation, a list of second terminals associated with the first terminal, where the list of second terminals includes an identifier of at least one second terminal; send a first control command to a second terminal when detecting an operation of selecting an identifier of the second terminal in the list of second terminals, so that the second terminal enables a WiFi point-to-point function according to the first control command, and sends a second control command to the first terminal; receive the second control command, and enable a WiFi point-to-point function according to the second control command; and establish a WiFi communication link to the second terminal, and share a file between the first terminal and the second terminal by using the WiFi communication link.

Specifically, the shared file is a first file on the first terminal, and when sharing the file between the first terminal and the second terminal by using the WiFi communication link, the processor 1201 is specifically configured to: transmit the first file to the second terminal by using the WiFi communication link.

Specifically, the shared file is a second file on the second terminal; and when sharing the file between the first terminal and the second terminal by using the WiFi communication link, the processor 1201 is specifically configured to: receive, by using the WiFi communication link, the second file sent by the second terminal.

Specifically, when receiving, by using the WiFi communication link, the second file sent by the second terminal, the processor 1201 is specifically configured to: receive, by using the WiFi communication link, a file list of second files that is sent by the second terminal; where the file list of second files includes identifiers of the second files; display the file list of second files; and perform a corresponding operation on the second file based on the file list of second files.

Specifically, when displaying, when detecting the file sharing operation, the list of second terminals associated with the first terminal, the processor 1201 is specifically configured to: search for a second terminal in a preset manner when detecting the file sharing operation; and display the list of second terminals when determining that the found second terminal is valid.

Specifically, the first terminal supports Bluetooth transmission, and the preset manner is a Bluetooth low energy transmission manner; and when displaying the list of second terminals when determining that the found second terminal is valid, the processor 1201 is specifically configured to: receive a broadcast message sent by the found second terminal in the Bluetooth low energy transmission manner, where the broadcast message includes a first check parameter; and display the list of second terminals when determining that the first check parameter is valid.

Specifically, when displaying, when detecting the file sharing operation, the list of second terminals associated with the first terminal, the processor 1201 is specifically configured to: obtain, when detecting the file sharing operation, an identifier of a second terminal that has an association relationship with the first terminal; and display the list of second terminals that have an association relationship with the first terminal.

Specifically, the list of second terminals that have an association relationship with the first terminal is a list of identifiers of second terminals that perform a same Multiple IMSI Single MSISDN service with the first terminal, where all terminals that perform the Multiple IMSI Single MSISDN service have a same mobile station international ISDN number. When obtaining, when detecting the file sharing operation, the list of second terminals that have an association relationship with the first terminal, the processor 1201 is specifically configured to: when detecting the file sharing operation, obtain, from a preset server, the list of identifiers of the second terminals that perform the same Multiple IMSI Single MSISDN service with the first terminal.

Specifically, when establishing the WiFi communication link to the second terminal based on the WiFi point-to-point function of the first terminal and the WiFi point-to-point function of the second terminal, the processor 1201 is specifically configured to: receive, by using the WiFi point-to-point function of the first terminal, a WiFi radio frequency signal sent by the second terminal, where the WiFi radio frequency signal is sent by the second terminal to the first terminal when the second terminal enables the WiFi point-to-point function, and the WiFi radio frequency signal carries a second check parameter; verify validity of the second terminal based on the second check parameter in the WiFi radio frequency signal; when determining that the second terminal is valid, send, to the second terminal, a request for establishing the WiFi communication link, where the request for establishing the WiFi communication link includes a third check parameter, so that the second terminal verifies validity of the first terminal based on the third check parameter, and after the verification succeeds, sends, to the first terminal, a response message for establishing the WiFi communication link; and establish the WiFi communication link to the second terminal when receiving the response message.

It may be learned from the foregoing that in this embodiment of this application, when a user needs to share the file in a WiFi P2P manner, the user needs to perform operations of only two steps of performing file sharing and selecting a terminal to be shared with (namely, the second terminal), and the first terminal and the second terminal may automatically enable the WiFi point-to-point function and establish the WiFi communication link. Therefore, operation steps of the user can be reduced, and user experience can be improved by using the method in this application compared with the prior art in which a user needs to perform operations of seven steps each time the user shares a file by using a WiFi P2P function.

Embodiment 7

Figure 15:
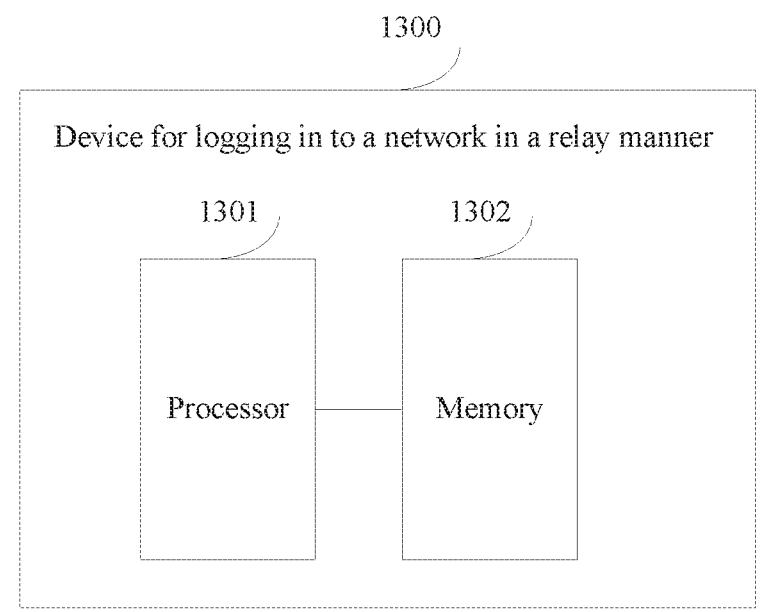
FIG. 15 is a schematic structural diagram of a device for logging in to a network in a relay manner according to an embodiment of this application.

Same as the foregoing concept, as shown in FIG. 15, this application further provides a device 1300 for logging in to a network in a relay manner. The device includes a processor 1301 and a memory 1302.

The processor 1301 is configured to read code in the memory 1302 so as to: when detecting an operation of logging in to a network in a relay manner, display an identifier of a second terminal associated with the device for logging in to a network in a relay manner; send a relay request to the second terminal when detecting an operation of selecting the identifier of the second terminal, so that the second terminal enables a relay hotspot according to the relay request, generates a related parameter associated with the relay hotspot, and sends the related parameter to the device; and when receiving the related parameter, log in to the network by using the second terminal as a relay based on the related parameter.

Specifically, when sending the relay request to the second terminal when detecting the operation of selecting the identifier of the second terminal, the processor is specifically configured to: send a first control command to the second terminal when detecting that the identifier of the second terminal is selected, so that the second terminal enables a WiFi point-to-point function according to the first control command, and sends a second control command to the device; receive the second control command, and enable a WiFi point-to-point function according to the second control command; establish a WiFi communication link to the second terminal based on the WiFi point-to-point function of the device and the WiFi point-to-point function of the second terminal; and send the relay request by using the WiFi communication link.

When receiving the related parameter, the processor is specifically configured to: receive the related parameter by using the WiFi communication link.

Specifically, when sending the relay request to the second terminal when detecting the operation of selecting the identifier of the second terminal, the processor is specifically configured to: send the relay request to the second terminal in a Bluetooth manner when detecting that the identifier of the second terminal is selected. When receiving the related parameter, the processor is specifically configured to: receive the related parameter in the Bluetooth manner.

In the foregoing manner, a user can log in to the network in the relay, manner at one click. This facilitates use for the user.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this application without departing from the spirit and scope of the embodiments of this application. This application is intended to cover these modifications and variations in the embodiments of this application provided that they fall within the scope of protection defined by the following claims and their equivalent technologies.

What is claimed is:

1. A method implemented by a first terminal for sharing a file between the first terminal and a third terminal, the method comprising:
receiving a request for a file sharing operation;
transmitting a first message to one or more other terminals in vicinity of the first terminal and obtaining identifiers of at least one second terminals that have an association relationship with the first terminal based on the received request for the file sharing operation, wherein obtaining the identifiers of the at least one second terminals that have the association relationship with the first terminal comprises obtaining, from a preset server, a list of at least one second terminal identifiers, and wherein the at least one second terminals and the first terminal are associated with a same Mobile Station International Subscriber Directory Number (MSISDN)

identifier, wherein the first message comprises a check parameter associated with a user of the first terminal;

determining the at least one second terminals for the file sharing operation from the one or more other terminals based on at least one second messages received from the at least one second terminals in association with the first message, wherein a second message comprises a same check parameter that was included in the first message and is associated with the user of the first terminal;

displaying the list of the at least one second terminals associated with the first terminal, wherein the list of the at least one second terminals comprises an identifier of each second terminal, wherein displaying the list of the at least one second terminals comprises displaying the identifiers of the at least one second terminals that have the association relationship with the first terminal;

detecting selection of a third terminal identifier from the list of the at least one second terminals, wherein the third terminal and the first terminal are associated with the same MSISDN identifier;

sending a first control command to the third terminal based on detecting the selection of the third terminal identifier for establishing a WiFi communication link with the third terminal;

receiving a second control command from the third terminal;

enabling a WiFi point-to-point function based on the second control command;

establishing the WiFi communication link with the third terminal comprises:
 receiving, using the WiFi point-to-point function of the first terminal, a WiFi radio frequency signal from the third terminal, wherein the WiFi radio frequency signal comprises a second check parameter;
 verifying validity of the third terminal based on the second check parameter;
 sending, when the second check parameter is valid and to the third terminal, a request for establishing the WiFi communication link, wherein the request for establishing the WiFi communication link comprises a third check parameter to enable the third terminal to verify a validity of the first terminal;
 receiving a response message from the third terminal; and
 establishing the WiFi communication link with the third terminal when the response message is received;

sharing, using the WiFi communication link, the file between the first terminal and the third terminal, wherein the file is stored on the third terminal, and wherein sharing the file between the first terminal and the third terminal using the WiFi communication link comprises receiving, using the WiFi communication link, the file from the third terminal; and receiving, using the WiFi communication link, the file from the third terminal comprises receiving, using the WiFi communication link, a list of files from the third terminal, wherein the list of files comprises identifiers of the files, and wherein the method further comprises:
 displaying the list of files; and
 performing a corresponding operation on the file based on the list of files.

2. The method of claim 1, wherein sharing the file between the first terminal and the third terminal using the WiFi communication link comprises transmitting the file to the third terminal using the WiFi communication link.

3. The method of claim 1, wherein determining the at least one second terminals comprises determining that the at least one second messages comprises a valid check parameter.

4. The method of claim 3, wherein the first terminal supports Bluetooth transmission, wherein transmitting the first message to the one or more other terminals comprises transmitting the first message based on a Bluetooth low energy transmission, and wherein the method further comprises receiving the at least one second messages as broadcast messages from the one or more other terminals in the Bluetooth low energy transmission, and further comprises determining, for each of the one or more other terminals, whether the check parameter of the one or more other terminal is valid by determining that both the first message and the at least one second messages comprise the same check parameter.

5. A first terminal comprising:
 at least one hardware processor; and
 a hardware memory coupled to the at least one hardware processor and storing programming instructions that, when executed by the at least one hardware processor, cause the first terminal to:
  receive a request for a file sharing operation;
  transmit a first message to one or more other terminals in vicinity of the first terminal and obtain identifiers of at least one second terminals that have an association relationship with the first terminal based on the received request for the file sharing operation, wherein obtaining the identifiers of the at least one second terminals that have the association relationship with the first terminal comprises obtaining, from a preset server, a list of at least one second terminal identifiers, and wherein the at least one second terminals and the first terminal are associated with a same Mobile Station International Subscriber Directory Number (MSISDN) identifier, wherein the first message comprises a check parameter associated with a user of the first terminal;
  determine the at least one second terminals for the file sharing operation from the one or more other terminals based on at least one second messages received from the at least one second terminals in association with the first message, wherein a second message comprises a same check parameter that was included in the first message and is associated with the user of the first terminal;
  display the list of the at least one second terminals associated with the first terminal, wherein the list of the at least one second terminals comprises an identifier of each second terminal, wherein displaying the list of the at least one second terminals comprises displaying the identifiers of the at least one second terminals that have the association relationship with the first terminal;
  detect selection of a third terminal identifier from the list of the at least one second terminals, wherein a third terminal and the first terminal are associated with the same MSISDN identifier;
  send a first control command to the third terminal based on detecting the selection of the third terminal identifier in the list of the at least one second terminals for establishing a WiFi communication link with the third terminal;
  receive a second control command from the third terminal;
  enable a WiFi point-to-point function according to the second control command;

establish the WiFi communication link with the third terminal comprises:

receiving, using the WiFi point-to-point function of the first terminal, a WiFi radio frequency signal from the third terminal, wherein the WiFi radio frequency signal comprises a second check parameter;

verifying validity of the third terminal based on the second check parameter;

sending, when the second check parameter is valid and to the third terminal, a request for establishing the WiFi communication link, wherein the request for establishing the WiFi communication link comprises a third check parameter to enable the third terminal to verify a validity of the first terminal;

receiving a response message from the third terminal; and establishing the WiFi communication link with the third terminal when the response message is received;

share a file between the first terminal and the third terminal using the WiFi communication link, wherein the file is stored on the third terminal, and wherein sharing the file between the first terminal and the third terminal using the WiFi communication link comprises receiving, using the WiFi communication link, the file from the third terminal; and receive, using the WiFi communication link, the file from the third terminal comprises receiving, using the WiFi communication link, a list of files from the third terminal, wherein the list of files comprises identifiers of the files, and wherein the instructions, when executed by the at least one hardware processor, further cause the first terminal to:

display the list of files; and perform a corresponding operation on the file based on the list of files.

6. The first terminal of claim 5, wherein the instructions that cause the first terminal to share the file between the first terminal and the third terminal using the WiFi communication link comprise instructions that, when executed by the at least one hardware processor, cause the first terminal to transmit the file to the third terminal using the WiFi communication link.

7. The first terminal of claim 5, wherein when determining the second terminals, the instructions, when executed by the at least one hardware processor, cause the first terminal to determine that the at least one second messages comprises a valid check parameter.

8. The first terminal of claim 7, wherein the first terminal supports Bluetooth transmission, wherein when transmitting the first message to the one or more other terminals, the instructions, when executed by the at least one hardware processor, cause the first terminal to transmit the first message based on a Bluetooth low energy transmission, and wherein the instructions, when executed by the at least one hardware processor, further cause the first terminal to:

receive the at least one second messages as broadcast messages from the one or more other terminals in the Bluetooth low energy transmission; and determine, for each of the one or more other terminals, whether the check parameter of the one or more other terminals is valid by determining that both the first message and the at least one second messages comprise the same check parameter.

9. A non-transitory computer-readable storage medium storing computer-readable program code that, when executed by a hardware processor of a first terminal, causes the first terminal to:

receive a request for a file sharing operation;

transmit a first message to one or more other terminals in vicinity of the first terminal and obtain identifiers of at least one second terminals that have an association relationship with the first terminal based on the received request for the file sharing operation, wherein obtaining the identifiers of the at least one second terminals that have the association relationship with the first terminal comprises obtaining, from a preset server, a list of at least one second terminal identifiers, and wherein the at least one second terminals and the first terminal are associated with a same Mobile Station International Subscriber Directory Number (MSISDN) identifier, wherein the first message comprises a check parameter associated with a user of the first terminal;

determine the at least one second terminals for the file sharing operation from the one or more other terminals based on at least one second messages received from the at least one second terminals in association with the first message, wherein a second message comprises a same check parameter that was included in the first message and is associated with the user of the first terminal;

display the list of the at least one second terminals associated with the first terminal, wherein the list of the at least one second terminals comprises an identifier of each second terminal, wherein displaying the list of the at least one second terminals comprises displaying the identifiers of the at least one second terminals that have the association relationship with the first terminal;

detect selection of a third terminal identifier from the list of the at least one second terminals, wherein a third terminal and the first terminal are associated with the same MSISDN identifier;

send a first control command to the third terminal based on detecting the selection of the third terminal identifier in the list of the at least one second terminals for establishing a WiFi communication link with the third terminal;

receive, from the third terminal, a second control command;

enable a WiFi point-to-point function according to the second control command;

establish the WiFi communication link with the third terminal comprises:

receiving, using the WiFi point-to-point function of the first terminal, a WiFi radio frequency signal from the third terminal, wherein the WiFi radio frequency signal comprises a second check parameter;

verifying validity of the third terminal based on the second check parameter;

sending, when the second check parameter is valid and to the third terminal, a request for establishing the WiFi communication link, wherein the request for establishing the WiFi communication link comprises a third check parameter to enable the third terminal to verify a validity of the first terminal;

receiving a response message from the third terminal; and establishing the WiFi communication link with the third terminal when the response message is received;

share a file between the first terminal and the third terminal using the WiFi communication link, wherein the file is stored on the third terminal, and wherein sharing the file between the first terminal and the third terminal using the WiFi communication link comprises receiving, using the WiFi communication link, the file from the third terminal; and receive, using the WiFi communication link, the file from the third terminal comprises receiving, using the WiFi communication link, a list of files from the third terminal, wherein the list of files comprises identifiers of the files, and wherein the computer-readable program code that, when executed by the hardware processor, further cause the first terminal to:

display the list of files; and perform a corresponding operation on the file based on the list of files.

* * * * *